United States Patent
Sainthuile et al.

(10) Patent No.: US 6,546,338 B2
(45) Date of Patent: Apr. 8, 2003

(54) METHOD FOR WORKING OUT AN AVOIDANCE PATH IN THE HORIZONTAL PLANE FOR AN AIRCRAFT TO RESOLVE A TRAFFIC CONFLICT

(75) Inventors: Gérard Sainthuile, Orsay (FR); Christophe Solans, Toulouse (FR)

(73) Assignee: Thales, Paris (FR)

( * ) Notice: Subject to any disclaimer, the term of this patent is extended or adjusted under 35 U.S.C. 154(b) by 0 days.

(21) Appl. No.: 10/049,292

(22) PCT Filed: Jun. 1, 2001

(86) PCT No.: PCT/FR01/01714

§ 371 (c)(1),
(2), (4) Date: Feb. 11, 2002

(87) PCT Pub. No.: WO01/95289

PCT Pub. Date: Dec. 13, 2001

(65) Prior Publication Data

US 2002/0152029 A1 Oct. 17, 2002

(30) Foreign Application Priority Data

Jun. 9, 2000 (FR) .......................... 00 07453

(51) Int. Cl.$^7$ ............................... G06F 17/00
(52) U.S. Cl. .................. 701/301; 701/7; 701/302; 301/961; 342/29; 342/455
(58) Field of Search .................. 701/3, 4, 201, 701/301, 120, 302, 7; 340/961, 968, 971, 972, 825.69; 342/455, 32, 29, 30, 25

(56) References Cited

U.S. PATENT DOCUMENTS

| | | | | |
|---|---|---|---|---|
| 3,736,559 | A | * 5/1973 | Trageser et al. | ....... 340/815.69 |
| 3,882,497 | A | * 5/1975 | Klass et al. | .................... 342/32 |
| 3,939,476 | A | * 2/1976 | Leopard et al. | ............. 342/464 |
| 4,317,119 | A | * 2/1982 | Alvarez | ...................... 342/455 |
| 5,153,836 | A | * 10/1992 | Fraughton et al. | .......... 340/361 |
| 5,636,123 | A | * 6/1997 | Rich et al. | .................... 342/29 |
| 5,657,009 | A | * 8/1997 | Gordon | ...................... 340/968 |
| 6,021,374 | A | * 2/2000 | Wood | ......................... 244/175 |
| 6,061,612 | A | 5/2000 | Sainthuile et al. | ............. 701/7 |
| 6,085,150 | A | * 7/2000 | Henry et al. | ................. 340/961 |
| 6,314,366 | B1 | * 11/2001 | Farmakis et al. | ........... 340/361 |
| 2001/0044680 | A1 | * 11/2001 | Lemelson et al. | ............. 701/3 |

FOREIGN PATENT DOCUMENTS

| | | |
|---|---|---|
| EP | 0 598 154 | 5/1994 |
| WO | 97 47945 | 12/1997 |
| WO | WO 00/71985 A1 | * 11/2000 |

OTHER PUBLICATIONS

M.S. Eby et al.: "Free flight separation assurance using distributed algorithms" 1999 IEEE Aerospace Conference, vol. 2, p. 430 Mar. 6–Mar. 13, 1999.

U.S. patent application Ser. No. 10/049,292, filed Feb. 11, 2002, pending.

U.S. patent application Ser. No. 10/148,904, filed Jun. 20, 2002, pending.

\* cited by examiner

*Primary Examiner*—Thomas G. Black
*Assistant Examiner*—Ronnie Mancho
(74) *Attorney, Agent, or Firm*—Oblon, Spivak, McClelland, Maier & Neustadt, P.C.

(57) ABSTRACT

The preparation of an avoidance path in the horizontal plane so that an aircraft can resolve a conflict of routes with another aircraft that entails a risk of collision within 5 to 10 minutes. This avoidance path minimizes the negative effects of the resultant route diversion on the flight plan of the aircraft. A method prepares an avoidance path with two parts. The first part is an evasive part with an initial heading such that the threatening aircraft takes a path, in relation to the threatened aircraft, that is tangential, on one side or the other, to the edges of the angle at which the threatening aircraft perceives a circle of protection plotted around the threatened aircraft. The radius of this circle of protection is equal to a minimum permissible separation distance. The second part of the evasive path is that of homing in on the initial route. This method of preparing an avoidance path can be implemented by a flight management computer. Once the avoidance path has been accepted by the aircraft crew, the flight management computer ensures that the avoidance path is followed by the automatic pilot.

11 Claims, 5 Drawing Sheets

METHOD FOR WORKING OUT AN AVOIDANCE PATH IN THE HORIZONTAL PLANE FOR AN AIRCRAFT TO RESOLVE A TRAFFIC CONFLICT

BACKGROUND OF THE INVENTION

1. Field of the Invention

The present invention relates to the management of the risks of in-flight collision between aircraft.

2. Discussion of the Background

Risks of collision between aircraft have been taken into consideration very early in the history of air transport owing to the fact that concentrations of aircraft occur naturally in the vicinity of airports. To avert such collisions, according to the first solution devised, aircraft were required to follow strictly demarcated air corridors in which their progress was monitored from the ground by air traffic controllers belonging to air traffic control (ATC) organizations. Air traffic controllers are responsible for a territory in which they organize the circulation of aircraft in authorized air corridors. For the regulation of air traffic, the controllers on the ground have information available on the movement of aircraft above their territory. This information comes from the flight plans of aircraft communicated in advance, real-time measurements by their surveillance radars dispersed over their territory and sound and data exchanges with the crew and navigation equipment of the aircraft. The risks of collision between aircraft are detected on the ground by the air traffic controllers using data in their possession and also in flight by the crews of aircraft who keep a visual watch. However, except in cases of extreme emergency, the initiative for avoidance maneuvers comes under the sole responsibility of air traffic controllers.

Traffic density is constantly increasing in the vicinity of certain airports, and the risks of collision are becoming increasingly a matter of concern. This is why the United States Federal Aviation Administration (FAA) launched a program in the 1960s to create equipment for the automatic detection of in-flight collision risks designed initially for passenger aircraft. This program led to the devising of several successive generations of a system known as the Traffic Collision Avoidance System (TCAS) specializing in the detection of very short-term in-flight collision risks (i.e. risks of collision within less than one minute)

A set of TCAS instruments establishes co-operation between aircraft travelling in the same neighborhood by means of another piece of onboard equipment, the transponder, whose use in the meantime, has become widespread on board aircraft for the transmission, to the ground, of information on the aircraft so as to improve their localization by the air traffic controllers.

A first generation of TCAS instruments that was available towards the 1980s, the TCAS 1 system, worked together with Mode-C transponders originally designed to respond to an interrogation by a special radar placed on the ground, known as an "secondary radar" to give a piece of information on the identity and altitude of the aircraft that carried it and also enable a measurement of the distance between said aircraft and the secondary radar and a measurement of the speed of said aircraft, these measurements being based on the propagation time of the radio-electrical signals and the variation of this propagation time from one interrogation to another. When placed on board an aircraft, a TCAS 1 instrument periodically sends interrogation signals to the mode-C transponders of the aircraft moving in the vicinity. It picks up their responses, processes these responses, and deduces their positions in terms of distance and heading, the speeds and the altitude levels of the different aircraft moving in the vicinity of the aircraft into which the instrument is integrated. It places this information at the disposal of the crew by means of a special screen and generates alarms known as Traffic Advisories (TA) when it is detected that aircraft could come close within far too small a distance. The crew of an aircraft equipped with the TCAS 1 is informed of the risk of collision but receives no advice on the nature of the evasive maneuver to be performed. This evasive maneuver cannot be done without reference to the air traffic controller, and only in the vertical plane and within a limit of 300 feet.

A second generation of TCAS instruments which is more efficient, namely the TCAS II generation, is currently available. The TCAS II co-operates with mode-C transponders or mode-S transponders and, in addition to the TA alarms, gives Resolution Advisories ("RA") consisting of instructions to climb or descend at 2,500 feet per minute in order to avoid another aircraft, often with an indication of the descent or climb gradient to be adopted to eliminate the risk of collision. Furthermore, when two aircraft involved in a collision risk are both equipped with TCAS II instruments, their TCAS II instruments work together to prevent any conflict and not give the two aircraft simultaneous and contradictory advice on maneuvers that would not eliminate the risks of collision.

A third generation of TCAS instruments, namely the TCAS III generation, is not being envisaged. This is a generation with higher precision in the assessment of heading positions, paths and speeds of other aircraft obtained by means of a specific directional antenna and improved mode-S transponders which, in their response signals, give the GPS (global positioning system) position and the speed vector of the carrier of the transponder. These TCAS III instruments would furnish advice on RA maneuvers including lateral evasion instructions in the horizontal plane, made possible by the improved precision that is being anticipated.

The congestion of air traffic routes over certain territories, for example in Europe, and the improvement of the precision of the navigation means available to the aircraft following the deployment of the GPS satellite navigation systems such as the American GNSS (Global Navigation Satellite System) or the Russian GLONASS (GLObal Navigation Satellite System) are today leading air-traffic control authorities to consider abandoning the requirement, on certain routes, for aircraft to follow preset air corridors and to consider the granting to aircraft, of a certain degree of liberty in the choice of their route outside airports approach zones and outside certain flight levels. This is the navigation technique known as "Free Flight." In addition to a reduced concentration of aircraft in the sky outside airport approach zones and, hence, a reduction in the risks of collision between aircraft, this technique of Free Flight navigation is likely to enable the following of the great circles track between points of the globe that are not directly linked by a predefined air corridor and for which the following of predefined air corridors necessitates more or less great detours.

The Free Flight navigation technique requires not only that aircraft should be equipped with precise navigation means but also that they should be capable, on their own, of resolving conflicts of traffic with other aircraft giving rise to medium-term collision risks, namely risks of collision within about five to ten minutes, whereas this conflict resolution is the task of air traffic controllers during traffic within predefined air corridors. It can be envisaged that the function of medium-term air collision protection will be fulfilled up board aircraft using the Free Flight navigation technique by means of the latest generations of TCAS instruments by augmenting their sensitivity so as to obtain sufficiently early anti-collision warnings, especially as the main problem encountered with TCAS instruments, namely that of false alarms, does not arise beyond a certain distance from airports.

Although a TCAS instrument with increased sensitivity is able to warn an aircraft carrying using the Free Flight technique of a risk of medium-term collision, namely a risk of collision within five to ten minutes, and warn this instrument that it is up to itself to carry out an avoidance maneuver, it cannot propose the most appropriate modification of the aircraft route and, at most, gives a suggestion of an avoidance maneuver by the top, the bottom, right or left. This simple suggestion of a maneuver, which is well suited to a emergency situation namely that of a collision risk within the next minute, is not suited to the resolution of a traffic conflict where the risk of collision is only a medium-term risk of collision within five to ten minutes.

When it is informed of a traffic conflict generating a medium-term collision risk, the crew of an aircraft has the time to decide on its own on the route modification to be made in order to eliminate the risk of collision, in searching for the avoidance path whose consequences are the least detrimental to the progress of the aircraft mission. In making this search, it will attach greater importance to the shortest possible path diversion at constant speed in the horizontal plane rather than to a change in speed or a path diversion in the vertical plane, both of which are more difficult to manage for the aircraft and more disturbing for the rest of the traffic.

This search for the best change in route that will eliminate the risk of collision following a reported traffic conflict is a difficult task implying a sudden increase in the work of the crew at a very time when it has to increase its vigilance and carry out both visual and radio monitoring at the same time to locate and make contact with the threatening aircraft. Assistance from the aircraft flight management computer would then be welcome.

There are onboard flight management computers capable of making in-flight modifications of the initially planned route. This is done for the avoidance, in the horizontal or vertical planes, of a zone that is belatedly recognized to be dangerous, for example a stormy zone, and it is done at minimum cost in terms of consequences for the mission of the aircraft. However, these flight management computers use methods to determine the avoidance path that are not suited to the circumventing of a zone that is moving at high speed as in the case with the zone that surrounds another aircraft.

SUMMARY OF THE INVENTION

The present invention is therefore aimed at a method for the preparation of an avoidance path in the horizontal plane for an aircraft, with a view to resolving a traffic conflict with another aircraft, this method being efficient while causing the least possible disturbance to the goals of the initially planned mission, especially in terms of delay, comfort and consumption, and being easily integrated into the initially planned route for automatic tracking by the navigation and control systems of the aircraft, in order to simplify the work of the aircraft crew and considerably reduce the increase in workload that the crew undergoes in the event of an warning of a risk of medium-term collision with other aircraft.

An object of the invention is a method for the preparation of an avoidance path in a horizontal plane, for a first aircraft following a first route called an initial route, in order to resolve a conflict of traffic with a second aircraft following a second route that may be identical to the first route, on the basis of knowledge of a minimum safety distance S to be maintained between two aircraft, and of the positions $X_1$ and $X_2$ and of the horizontal speed vectors $\vec{V_1}$ and $\vec{V_2}$ of the two aircraft, said method comprising the following steps:

the determining of the horizontal speed vector $\vec{V_{rel}}$ of the second aircraft relative to the first aircraft, the determining, in the horizontal plane, of a circle of protection $C_1$ around the first aircraft with the minimum safety distance S as its radius, the testing of the intersection of the straight line bearing the horizontal speed vector $\vec{V_{rel}}$ of the second aircraft with respect to the first one, with the circle of protection $C_1$ of the first aircraft, and in the event of the intersection of the circle of protection of the first aircraft by the horizontal speed vector $\vec{V_{rel}}$ of the second aircraft relative to the first aircraft, implying a risk of collision, namely a tendency for the separation distance between the two aircraft to get reduced until it goes below the minimum safety distance S, the determining of the angle $\vec{\alpha_b} - \vec{\alpha_c}$ at which the second aircraft perceives the circle of protection $C_1$ of the first aircraft, the determining of a start-of-avoidance-maneuver point $P_{SOM}$ located on the initial route of the first aircraft and shifted downline from the current position $X_1$ of the first aircraft, the determining of at least one value of heading angle $\vec{\Theta_{1b}}$ and/or $\vec{\Theta_{1c}}$ to be followed by the first aircraft, without changing the horizontal speed modulus, to bring the horizontal speed vector $\vec{V_{rel}}$ of the second aircraft relative to the first aircraft at most on one of the sides $\vec{X_2b}$, $\vec{X_2c}$, of the angle at which the second aircraft perceives the circle of protection $C_1$ of the first aircraft, the determining of at least one collision-risk avoidance path for the first aircraft comprising a first evasive path constituted by a rectilinear segment having the start-of-avoidance-maneuver point $P_{SOM}$ as its point of origin, one of the new values of heading angle $\Theta_{1b}$ or $\Theta_{1c}$ obtained at the previous step as its heading and having, as its end, a rotating point $P_T$ chosen beyond a point $C_{PA1}$ where the separation distance between the two aircraft passes through a minimum value equal to a minimum safety distance S, and, beyond the rotating point $P_T$, a second homing path to the initial route.

Advantageously, the step for determining at least one new value of heading angle comprises:

a test on the oriented angle $\vec{\phi_c}$ existing between, firstly, the horizontal speed vector $\vec{V_2}$ of the second aircraft and, secondly, that side $\vec{X_2c}$ of the sides $\vec{X_2b}$, $\vec{X_2c}$ of the angle at which the second aircraft perceives the circle of protection $C_1$ of the first aircraft, whose orientation is at the greatest distance from that of the horizontal speed vector $\vec{V_2}$ of the second aircraft:

$$\vec{\phi_c} = (\vec{V_2}, \vec{X_{2c}})$$

said test consisting in verifying the inequality:

$$|\sin\vec{\varphi_c}| < \frac{\|\vec{V_1}\|}{\|\vec{V_2}\|}$$

and,
if this inequality is not verified,
the determining of a single value of heading angle $\vec{\Theta_{1b}}$ to be followed by the first aircraft, without changing the modulus of its horizontal speed vector to bring the horizontal speed vector $\vec{V_{rel}}$ of the second aircraft relative to the first aircraft to the side $\vec{X_2b}$ of the angle at which the second aircraft perceives the circle of protection $C_1$ of the first aircraft, whose orientation is the closest to that of the horizontal speed vector $\vec{V_2}$ of the second aircraft.

if this inequality is verified,
the determining of two new values of heading angle $\vec{\Theta_{1b}}$ and $\vec{\Theta_{1c}}$ to be followed by the first aircraft, without changing its horizontal speed modulus to bring the horizontal speed vector $\vec{V_{rel}}$ of the second aircraft relative to the first aircraft to one of the sides $\vec{X_2b}$, $\vec{X_2c}$, of the angle at which the second aircraft perceives the circle of protection $C_1$ of the first aircraft, one aircraft on one side $\vec{X_2b}$, the other on the other side $\vec{X_2c}$.

Advantageously, if more than one new value of heading angle $\vec{\Theta_{1b}}$ and $\vec{\Theta_{1c}}$ to be followed by the first aircraft, without changing its horizontal speed modulus to bring the horizontal speed vector $\vec{V_{rel}}$ of the second aircraft relative to the first aircraft to one of the sides $\vec{X_2b}$, $\vec{X_2c}$ of the angle at which the second aircraft perceives the circle of protection $C_1$ of the first aircraft, have been determined during the step for determining at least one new value of heading angle, the step for determining at least one avoidance path consists of the determining of two avoidance paths, one for each of the two new values of heading angle $\vec{\Theta_{1b}}$ and $\vec{\Theta_{1c}}$.

Advantageously, when the method for preparing an anti-collision avoidance path in the horizontal plane comprises a step for determining at least one avoidance path leading to the determining of more than one avoidance path, the method is supplemented by an additional step for the selection of the avoidance path to be implemented, consisting in making a choice, from among the avoidance paths, of the path that minimizes the lengthening of the initial route of the first aircraft.

Advantageously, the second homing part for homing into the initial route of an avoidance path starts, from the rotating point $P_T$ marking the end of the first evasive part of this avoidance path, with a rectilinear segment following a new heading which, with respect to the heading of the initial route, has an angular divergence opposite to that of the rectilinear segment of the first evasive part of said avoidance path.

Advantageously, when the second homing part of the initial route of an avoidance path starts with a rectilinear segment, the rotating point $P_T$ that makes the transition, within said avoidance part, between the end of the rectilinear segment of the first evasive part and the rectilinear segment starting the second homing part of the initial route, is chosen, on the rectilinear segment of the first evasive part, so that it is sufficiently distant from the point $C_{PA1}$ where the separation distance between the two aircraft passes through a minimum equal to the minimum safety distance S so that the separation distance between the two aircraft does not go below the minimum safety distance S during the journey, by the first aircraft, on the rectilinear segment starting the second homing part of said avoidance path.

Advantageously, the modulus of the half-angle or $\|\vec{\alpha_b}\|$ or $\|\vec{\alpha_c}\|$ at which the second aircraft perceives the circle of protection $C_1$ of the first aircraft is deduced from the relationship:

$$\|\vec{\alpha_b}\| = \|\vec{\alpha_c}\| = \arcsin\left(\frac{S}{\|\vec{X_1X_2}\|}\right)$$

Advantageously, a new value of heading angle $\vec{\Theta_{1j}}$ to be followed by the first aircraft, without changing the horizontal speed modulus, to bring the horizontal speed vector $\vec{V_{rel}}$ of the second aircraft relative to the first aircraft on one of the sides $\vec{X_2b}$ or $\vec{X_2c}$, called the envisaged side $\vec{X_2j}$, of the angle at which the second aircraft perceives the circle of protection of the first aircraft, is obtained by means of an angular relationship that links this new value of heading angle INCORPORER$\vec{\Theta_{1j}}$ to:

the heading $\vec{\psi}$ of the oriented straight line linking the position $X_1$ of the first aircraft to the position $X_2$ of the second aircraft, the half-angle $\vec{\alpha_i}$ at which the second aircraft perceives the circle of protection $C_1$ of the first aircraft, oriented from the bisector of the angle constituted by the oriented straight line $\vec{X_2X_1}$ linking the position $X_2$ of the second aircraft to the position $X_1$ of the first aircraft, towards the envisaged side $\vec{X_2j}$ of the angle at which the second aircraft perceives the circle of protection $C_1$ of the first aircraft, and the oriented angle $\vec{\gamma_j}$ made by the envisaged side $\vec{X_2j}$ of the angle at which the second aircraft perceives the circle of protection $C_1$ of the first aircraft, with the new vector $\vec{V_{ij}}$ sought for the horizontal speed of the first aircraft in order to eliminate a risk of collision, this angular relationship being expressed by the relationship:

$$\vec{\Theta_{1j}} = \vec{\psi} + \vec{\alpha_j} + \vec{\gamma_j} + 2k\pi$$

it being known that:
k is an integer,
the horizontal speed vector $\vec{V_{rel}j}$ of the second aircraft with respect to the first aircraft, when it travels through the envisaged side $\vec{X_2j}$ of the angle at which the second aircraft perceives the circle of protection $C_1$ of the first aircraft, is equal to the difference between the horizontal speed vector $\vec{V_2}$ of the second aircraft and the vector sought $\vec{V_{1j}}$ for the horizontal speed of the first aircraft which, by assumption, has the same modulus as the horizontal speed vector $\vec{V_1}$ of the first aircraft:

$$\begin{cases} \vec{V}_{rel}^j = \vec{V}_2 - \vec{V}_1^j \\ \|\vec{V}_1^j\| = \|\vec{V}_1\| \end{cases}$$

the half-angle $\vec{\alpha}_j$ at which the second aircraft perceives the circle of protection $C_1$ of the first aircraft, oriented from the bisector of the angle constituted by the oriented straight line $\overrightarrow{X_2X_1}$ linking the position $X_2$ of the second aircraft to the position $X_1$ of the first aircraft, towards the envisaged side $\overrightarrow{X_2j}$ of the angle at which the second aircraft perceives the circle of protection $C_1$ of the first aircraft, has the value:

$$\vec{\alpha}_j = \pm \arcsin\left(\frac{S}{\|\overrightarrow{X_1X_2}\|}\right)$$

the oriented angle $\vec{\gamma}_j$ made by the envisaged side $\overrightarrow{X_2j}$ of the angle at which the second aircraft perceives the circle of protection $C_1$ of the first aircraft, with the new vector $\vec{V}_1^j$ sought for the horizontal speed of the first aircraft in order to eliminate a risk of collision, is expressed as a function of the angle $\vec{\phi}_j$ oriented between, firstly, the horizontal speed vector $\vec{V}_2$ of the second aircraft, and, secondly, the envisaged side $\overrightarrow{X_2j}$ of the angle at which the second aircraft perceives the circle of protection $C_1$ of the first aircraft, by the relationship:

$$\vec{\gamma}_j = \arcsin\left(\frac{\|\vec{V}_2\|}{\|\vec{V}_1\|}\sin(\vec{\varphi}_j)\right)$$

(An absence of definition of the arcsine signifying an impossibility of determining the new value of heading angle $\vec{\Theta}_{1j}$ sought.)

and the oriented angle $\vec{\phi}_j$ between, firstly, the horizontal speed vector $\vec{V}_2$ of the second aircraft, and, secondly, the side envisaged $\overrightarrow{X_2j}$ of the angle at which the second aircraft perceives the circle of protection $C_1$ of the first aircraft, is expressed by the relationship:

$$\vec{\phi}_j = \vec{\psi} + \vec{\alpha}_j - \vec{\theta}_2 + \pi + 2k\pi$$

the oriented angle $\vec{\theta}_2$ being the heading of the second aircraft.

Advantageously, when the second homing part of an avoidance path starts with a rectilinear segment, the rotating point $P_T$ linking the rectilinear segment of the first evasive part and the rectilinear starting segment of the second homing part of an avoidance trajectory is chosen so as to be reached by the first aircraft after a minimum period of time equal to:

$$t_{cpa} = -\left(\frac{(\overrightarrow{X_1X_2})(\vec{V}_2 - \vec{V}_1^n)}{\|\vec{V}_2 - \vec{V}_1^n\|^2}\right)$$

$\vec{V}_1^n$ being the horizontal speed vector of the first aircraft when it travels through the first evasive part of its avoidance trajectory.

Advantageously, when the second homing part of an avoidance trajectory starts with a rectilinear segment, the distance $D_{CPA1}$ which, on the rectilinear segment of the first evasive part of an avoidance trajectory of the first aircraft, separates the position $C_{PA1}$ where the first aircraft perceives its distance from the second aircraft reach a minimum equal to the minimum safety distance S, from the position $P_{SOM}$ of the beginning of the avoidance trajectory is drawn from the relationship:

$$D_{CPA1} = t_{cpa} \times \|\vec{V}_1\|$$

with:

$$t_{cpa} = -\left(\frac{(\overrightarrow{X_1X_2})(\vec{V}_2 - \vec{V}_1^n)}{\|\vec{V}_2 - \vec{V}_1^n\|^2}\right)$$

$\vec{V}_1^n$ being the horizontal speed vector of the first aircraft when it follows the rectilinear segment of the first evasive part of its avoidance trajectory.

Advantageously, when the second homing part of an avoidance trajectory starts with a rectilinear segment, the distance $D_{PT}$ which, on the rectilinear segment of the first evasive part of the avoidance trajectory of the first aircraft, separates the position $C_{PA1}$ where the first aircraft perceives its distance from the second aircraft reach a minimum equal to the minimum safety distance S, from the rotating point $P_T$ marking the end of the rectilinear segment of the first part of an avoidance path, is drawn from the relationship:

$$D_{PT} = t_{PT} \times \|\vec{V}_1\|$$

with:

$$t_{PT} = S \times \tan\left(\frac{\overrightarrow{\chi_{EOM}} \times (\overrightarrow{\psi_{SOM}} + \pi + \overrightarrow{\alpha_{SOM}})}{2}\right) \times \frac{1}{\|\vec{V}_2 - \overrightarrow{V_{1SOM}}\|}$$

it being known that:

$\overrightarrow{\chi_{EOM}}$ is the heading of the relative speed vector of the second aircraft with respect to the first aircraft when the first aircraft embarks on the rectilinear segment starting the second evasive part of its avoidance trajectory, $\overrightarrow{\psi_{SOM}}$ is the heading of the oriented segment linking the position of the first aircraft with that of the second aircraft when the first aircraft is at the starting point $P_{SOM}$ of the first evasive part of its avoidance trajectory, $\overrightarrow{\alpha_{SOM}}$, previously named $\vec{\alpha}_b$ or $\vec{\alpha}_c$, is the half-angle at which the second aircraft perceives the circle of protection $C_1$ of the first aircraft while the first aircraft is at the starting point $P_{SOM}$ of the first evasive part of its avoidance path, this half-angle being oriented from the oriented segment, linking the position of the second aircraft to that of the first aircraft, towards the side of the angle at which the second aircraft perceives the circle of protection $C_1$ of the first aircraft, adopted to obtain passage of the trajectory of the second aircraft relative to the first aircraft, when this first aircraft describes the rectilinear segment of the first evasive part of its avoidance trajectory, and $\overrightarrow{V_{1SOM}}$ is the horizontal speed vector adopted by the first aircraft when it follows the rectilinear segment starting the second homing part of its avoidance trajectory.

BRIEF DESCRIPTION OF THE DRAWINGS

Other features and advantages of the invention shall appear from the following description of an embodiment of the invention given by way of an example. This description shall be made with reference to the drawings, of which.

DESCRIPTION OF THE PREFERRED EMBODIMENTS

Figure 1:
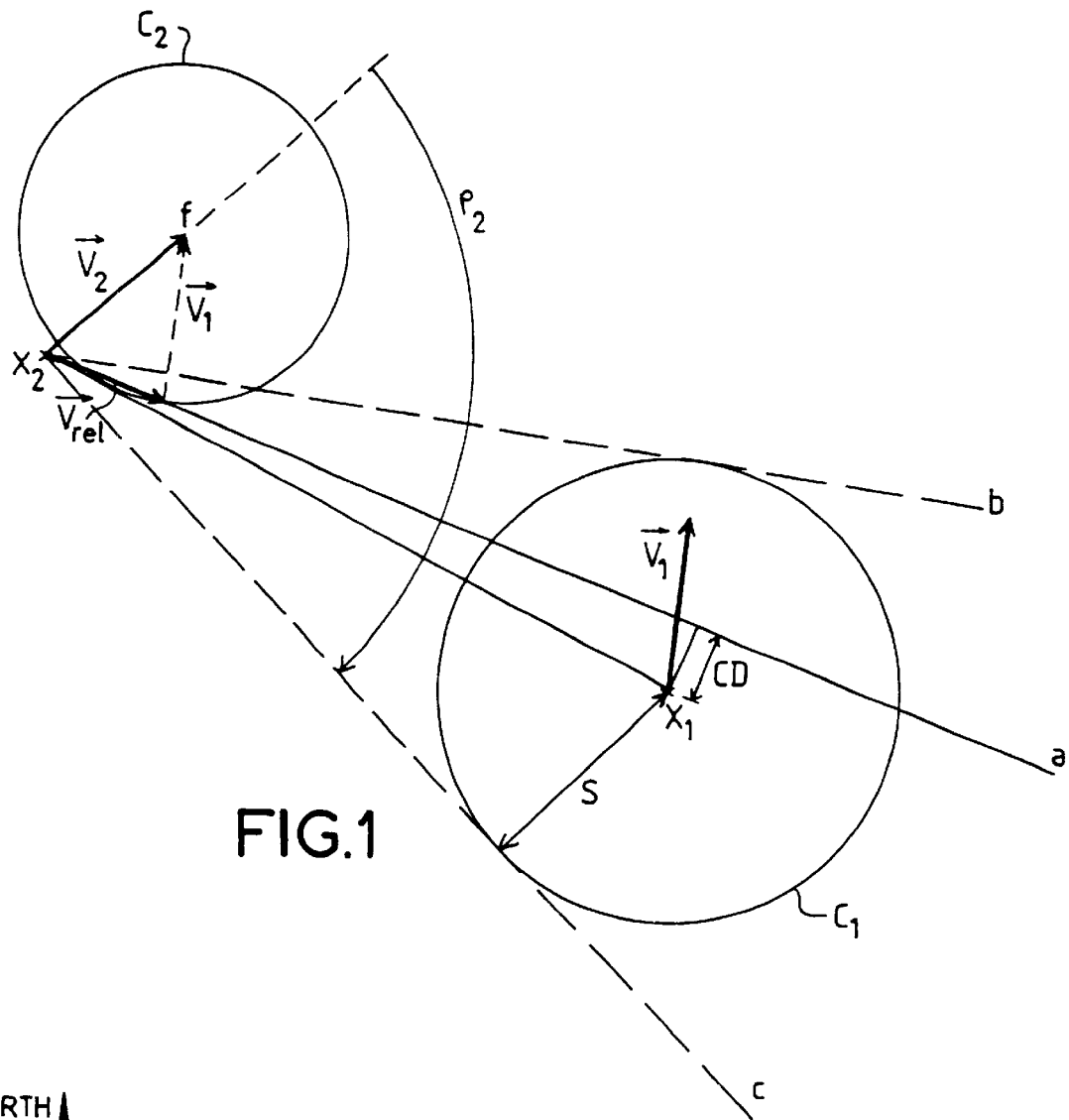
FIG. 1 is a graph providing a general illustration of a situation in which that is a medium-term risk of collision between two aircraft.

There is a risk of collision when two aircraft tend to approach each far too closely. This risk can be accessed by plotting a volume of protection around an aircraft, into which the other aircraft must not stray. The greater the volume of protection, the lower is the tolerated risk of collision. The basis on which the volume of protection is defined is rather the time taken by the protected aircraft to travel the distances that separate it, in the different directions, from the boundaries of this volume. This gives the protection volume a shape depending on the capacities of movement of the aircraft considered. However, it is assumed hereinafter, to simplify the description, that this protection volume has a circular section in the horizontal plane, centered on the aircraft because it is always possible to inscribe the horizontal section of a volume of protection of any shape in such a circle.

Furthermore, to estimate a risk of intrusion by a second aircraft into the volume of protection of a first aircraft, we consider the fact that aircraft generally follow pre-established routes constituted by a sequencing of straight segments traversed at constant speeds and joined by turn points so that, on the major part of their path, they have a constant short-term and medium-term speed vector. Monitoring the risk of collision therefore amounts to deducing the relative positions, in the near future, of the aircraft moving in the neighborhood, from the knowledge, at each point in time, of the positions and speed vectors of these aircraft, assuming that they maintain the same speed vectors, and then taking action if these foreseeable relative positions lead certain aircraft to penetrate the volume of protection of other aircraft.

Aircraft if a certain size are being increasingly equipped with onboard equipment for the prevention of imminent risks of collision. This equipment is known as TCAS equipment. The TCAS instruments make short-term forecasts of the air traffic around the aircraft into which they are fitted on the basis of the knowledge that they obtain, by co-operation between aircraft, of the positions and speed vectors of the aircraft moving in the neighborhood, and on the above-mentioned assumption of a short-term constancy of the speed vectors. As soon as a TCAS instrument makes a detection, in the vicinity of the aircraft in which it is installed, of another aircraft whose relative speed vector is oriented so as to cross the volume of protection of the aircraft in which it is installed, this instrument sends out an alarm on the risk of collision with an indication of the heading direction from which the threat of collision is coming and, as the case may be, it carries out a conflict resolution in which it designates that one of the two aircraft that must carry out an evasive maneuver and advises this aircraft on the nature of the evasive maneuver to be performed, namely: climb, descend, veer to the right or veer to the left.

It is envisaged to release flight at certain levels from the obligation to follow the routes imposed in order to enable an increase in the traffic without increasing the densities of aircraft outside the approach zones of the airports. This is the flight technique known as Free Flight. This Free Flight technique, which allows an aircraft to control its route once it reaches a certain flight level, calls for reinforced onboard anti-collision protection not only in the short term but also in the medium-term since the medium-term route conflicts between aircraft practicing Free Flight are no longer resolved by guidance from the ground. This reinforcement of the anti-collision protection may be carried out by TCAS instruments with increased sensitivity, especially as the main problem encountered by a TCAS instrument, namely the problem of false alarms, is far less acute in the Free Flight technique because this technique is envisaged only outside airports approach zones and above a certain altitude.

The crew of an aircraft has far greater liberty in the choice of an evasive maneuver to prevent a risk of medium-term collision than for a maneuver to prevent a risk of short-term collision with another aircraft. This enables it to prefer horizontal-plane route diversions rather than vertical-plane route diversions which are more difficult to manage. However, even in the horizontal plane, the possibilities of choice of route diversions are very great in number and it is not necessarily possible to spot the possibility, out of all these possibilities, that is the most advantageous in following the goals of the mission, meeting arrival time schedules, minimizing excess consumption of fuel, ensuring passenger comfort etc.

When it is warned of a medium-term risk of collision and the need for a route diversion, by an onboard instrument of the TCAS type with increased sensitivity, the crew of an aircraft is faced with a heavy overload of work when it should be carrying out a visual watch at the same time in order to spot the threatening aircraft. Furthermore, once the diversion path has been prepared by the crew of the aircraft, the path must be implemented without delay by manual piloting. This implies the disconnection of the automatic pilot which, normally, under the control of a flight management computer, provides for the automatic following of the initially planned route and can only be reconnected at the end of the diversion maneuver, when the aircraft has come back to its initial route.

A method is proposed here to prepare an avoidance path, in the horizontal plane, in order to resolve the traffic conflict that dictates a minimum detour from the initial route to stop the risk of collision and can be implemented by a flight management computer so that the crew of the aircraft, in the event of a detection of traffic conflict with another aircraft, always has an available proposal for the modification of its route that eliminates the risk of collision, brings minimum disturbance to the initial flight plan and can immediately be taken into account by the automatic pilot.

FIG. 1 gives a view, in a horizontal plane, in a relative reference system linked to a first aircraft, of a situation at a given point in time of a risk of collision with a second aircraft, it is being furthermore assumed that the distance between the flight levels of the two aircraft is not enough to eliminate every risk of collision. The first aircraft, to which the orientation reference is linked, has a fixed arbitrary position $X_1$ in the horizontal plane and a horizontal speed vector $\overrightarrow{V_1}$ while the second aircraft has a mobile position $X_2$ in the horizontal plane and a horizontal speed vector $\overrightarrow{V_2}$. It is assumed that the first aircraft, to which the horizontal plane of depiction is linked, is the one responsible for the avoidance maneuver, the choice of that one of the two aircraft which must perform the avoidance maneuver being determined by the application of navigation rules which are part of the organization of the air traffic and are not within the scope of the present invention. The first aircraft is surrounded by a volume of protection whose section in the horizontal plane of FIG. 1 is a circle $C_1$ centered on $X_1$, its radius being a minimum separation distance S for which it is sought to obtain compliance and which is chosen to be greater than or equal to the standard distance dictated by air traffic rules for the security of traffic when such a standard exists.

The horizontal speed vector $\overrightarrow{V_{rel}}$ of the second aircraft with respect to the first one is equal to the vector difference between the horizontal speed vector $\overrightarrow{V_2}$ of the second aircraft and the horizontal speed vector $\overrightarrow{V_1}$ of the first aircraft:

$$\overrightarrow{V_{rel}} = \overrightarrow{V_2} - \overrightarrow{V_1}$$

It is borne by an oriented straight line $\overrightarrow{X_2\alpha}$ which intercepts the circle of protection $C_1$ of the first aircraft and passes at a distance CD from the center $X_1$ of this circle $C_1$ smaller than the minimum stipulated separation distance S.

With the assumption commonly made for civilian aircraft having constant horizontal speed vectors in the medium and short terms, the second aircraft keeps the same horizontal speed vector $\overrightarrow{V_{rel}}$ relative to the first aircraft on a period of time sufficient to make it certain that, if nothing is done, it will follow a path that is the oriented straight line $\overrightarrow{X_2\alpha}$ and will pass to a minimum distance CD, from the first aircraft, that is smaller than the stipulated minimum distance S. There is therefore a risk of collision greater than the risk that was acceptable when the minimum distance was set at the value S. To avoid this collision risk it is necessary, by a maneuver of the first aircraft, to bring the path of the second aircraft, relative to the first aircraft, outside the angle at which the second aircraft perceives the circle of protection $C_1$ of the first aircraft. Since the maneuver of the first aircraft is limited to a simple change in orientation of its horizontal speed vector $\overrightarrow{V_1}$, the resolution of the collision risk amounts to determining the possible change or changes of heading to be applied to the first aircraft to bring the path of the second aircraft relative to the first aircraft outside the angle at which the second aircraft perceives the circle of protection $C_1$ of the first aircraft, namely at least on the tangents $\overrightarrow{X_2b}$ or $\overrightarrow{X_2c}$ to the circle of protection $C_1$ of the first aircraft plotted from the position $X_2$ of the second aircraft considered at the beginning of an avoidance maneuver.

It is always possible, by keeping the modulus $\|\overrightarrow{V_1}\|$ of the horizontal speed vector of the first aircraft but by modifying its orientation, to bring the horizontal speed vector of the second aircraft relative to the first aircraft to that side $\overrightarrow{X_2b}$ of the sides of the angle at which the second aircraft perceives the circle of protection $C_1$ of the first aircraft having the smallest angular divergence with the horizontal speed vector $\overrightarrow{V_2}$ of the second aircraft. Indeed, this side $\overrightarrow{X_2b}$ of the angle at which the second aircraft perceives the circle of protection $C_1$ of first aircraft is always intersected by the circle $C_2$ whose center is the end point f of the horizontal speed vector $\overrightarrow{V_2}$ of the second aircraft linked to the position $X_2$ of this second aircraft and whose radius is the modulus of the horizontal speed vector $\overrightarrow{V_1}$ of the first aircraft because it is closer to the circle $C_2$ than the oriented straight line $\overrightarrow{X_2\alpha}$ which initially bears the horizontal speed vector $\overrightarrow{V_{rel}}$ of the second aircraft relative to the first one and is already intersected by this circle $C_2$.

However, it is not always possible, by keeping the modulus $\|\overrightarrow{V_1}\|$ of the horizontal speed vector of the first aircraft invariable but by modifying its orientation, to bring the horizontal speed vector of the second aircraft, relative to the first one, to the side $\overrightarrow{X_2c}$ of the angle at which the second aircraft perceives the circle of protection $C_1$ of the first aircraft, which has the greatest angular divergence with respect to the horizontal speed vector $\overrightarrow{V_2}$ of the second aircraft. Indeed, the circle $C_2$ whose center is the end point f of the horizontal speed vector $\overrightarrow{V_2}$ of the second aircraft linked to the position $X_2$ of the second aircraft and whose radius is the modulus of the horizontal speed vector $V_1$ of the first aircraft, intersects this side $\overrightarrow{X_2c}$ only if its distance from this side $\overrightarrow{X_2c}$ is smaller than its radius. This takes place only if the sine of the oriented angle $\overrightarrow{\phi_c}$, between the horizontal speed vector $\overrightarrow{V_2}$ of the second aircraft and the side $\overrightarrow{X_2c}$ of the angle at which the second aircraft perceives the circle of protection $C_1$ of the first aircraft, is smaller than the ratio between the modulus of the horizontal speed vector $\overrightarrow{V_1}$ of the first aircraft and the modulus of the horizontal speed vector $V_2$ of the second aircraft, namely if the following inequality is verified:

$$|\sin\overrightarrow{\varphi_c}| < \frac{\|\overrightarrow{V_1}\|}{\|\overrightarrow{V_2}\|} \quad (1)$$

It will be seen hereinafter that the explicit verification of this inequality is not indispensable because it is done implicitly during an attempt to determine an evasive heading for the first aircraft. This enables the horizontal speed vector of the second aircraft, relative to the first aircraft, to be brought to the side $\overrightarrow{X_2c}$ of the angle at which the second aircraft perceives the circle of protection C of the first aircraft, which has the greatest angular divergence with respect to the horizontal speed vector $\overrightarrow{V_2}$ of the second aircraft. Indeed, during such an attempt, if this inequality is not verified, the result is an impossibility of computation.

Figure 2:
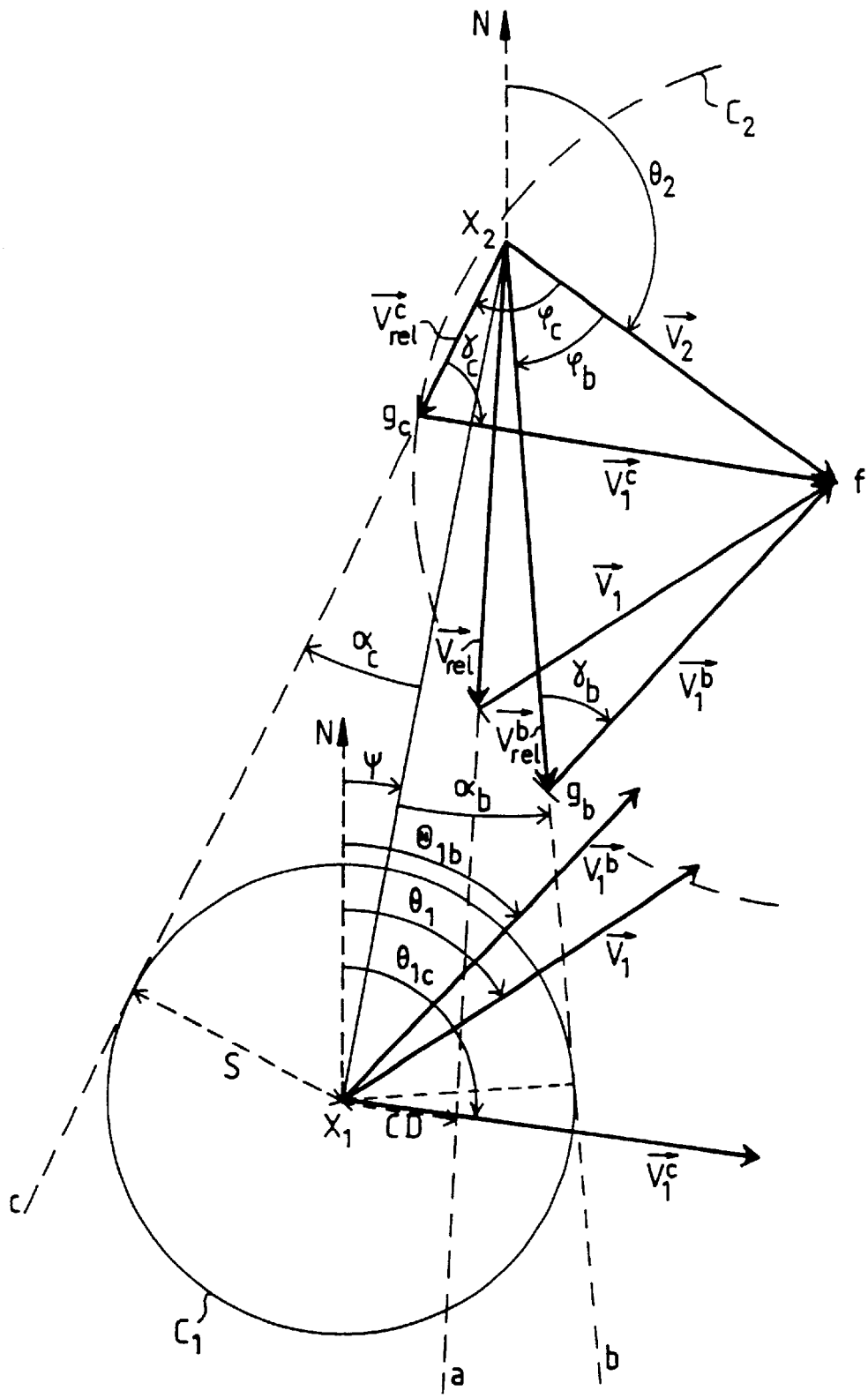
FIG. 2 is a graph essentially repeating the elements of the graph of FIG. 1, supplemented by the references of oriented angles and by vectors facilitating the understanding of the invention.

FIG. 2 is a geometrical figure illustrating the resolution of a case of collision risk with two possibilities of evasive heading, $\overrightarrow{\Theta_{1b}}$ and $\overrightarrow{\Theta_{1c}}$, for the first aircraft, both possibilities leading the second aircraft to go outside the angle at which it perceives the circle of security $C_1$ of the first aircraft, either to the side $\overrightarrow{X_2b}$ of the angle at which the second aircraft perceives the circle of protection $C_1$ of the first aircraft, oriented most closely to its horizontal speed vector $\overrightarrow{V_2}$, or to the side $\overrightarrow{X_2c}$ of the angle at which the second aircraft perceives the circle of protection $C_1$ of the first aircraft oriented at the greatest distance from its horizontal speed vector $\overrightarrow{V_2}$.

The horizontal speed vector of the second aircraft relative to the first aircraft is still equal to the vector difference between the horizontal speed vector of the second aircraft $\overrightarrow{V_2}$ which does not change since this second aircraft is not supposed to make any maneuvers, and the horizontal speed vector of the first aircraft which keeps a constant modulus $\|\overrightarrow{V_1}\|$ but has its orientation varying as a function of the changes in heading made by the first aircraft to resolve the risks of collision.

Before an avoidance maneuver by the first aircraft, the horizontal speed vector of the second aircraft relative to the first one $\overrightarrow{V_{rel}}$ is equal to the vector difference between the horizontal speed vector $\overrightarrow{V_2}$ of the second aircraft and the initial horizontal speed vector $\overrightarrow{V_1}$ of the first aircraft:

$$\overrightarrow{V_{rel}} = \overrightarrow{V_2} - \overrightarrow{V_1}$$

After an avoidance maneuver on the part of the first aircraft by which the path of the second aircraft is made to pass to the side $\overrightarrow{X_2b}$ of the angle at which it perceives the circle of security $C_1$ of the first aircraft, the side that is oriented at the closest to its horizontal speed vector $\overrightarrow{V_2}$, the second aircraft must have, relative to the first aircraft, a horizontal speed vector $\overrightarrow{V_{rel}^b}$ which, firstly, is carried by the side $X_2b$ of the angle at which the second aircraft perceives the circle of protection $C_1$ of the first aircraft and, secondly, results from the vector difference between the unchanged horizontal speed vector $\overrightarrow{V_2}$ of the second aircraft and the new horizontal speed vector $\overrightarrow{V_1^b}$ adopted by the first aircraft after the avoidance maneuver which is distinguished from the initial horizontal speed vector initial $\overrightarrow{V_1}$ of the first aircraft only by its orientation:

$$\overrightarrow{V_{rel}^b} = \overrightarrow{V_2} - \overrightarrow{V_1^b}$$

The new horizontal speed vector $V_{rel}^b$ of the second aircraft with respect to the first aircraft, after execution of the avoidance maneuver by the first aircraft, is easily obtained by geometrical construction. Indeed, when it is linked to the location $X_2$ of the second aircraft, its end is necessarily at the crossing point between the oriented straight line $\overrightarrow{X_2b}$ and the circle $C_2$ centered at the end f of a bound vector $\overrightarrow{X_2f}$ equal to the horizontal speed vector $\overrightarrow{V_2}$ of the second aircraft and having a radius equal to the modulus of the horizontal speed vector $\overrightarrow{V_1}$ of the first aircraft. The same geometrical construction gives the new horizontal speed vector $\overrightarrow{V_1^b}$ of the first aircraft after its avoidance maneuver.

In the same way, after an avoidance maneuver by the first aircraft by which the path of the second aircraft is made to pass to the other side $\overrightarrow{X_2c}$ of the angle at which it perceives the circle of security of the first aircraft, on the side that is oriented at the greatest distance from its horizontal speed vector $\overrightarrow{V_2}$, the second aircraft must have a horizontal speed vector $\overrightarrow{V_{rel}^c}$ relative to the first one which, firstly, is carried by the side $X_2c$ of the angle at which the second aircraft perceives the circle of protection $C_1$ of the first aircraft and which, secondly, results from the vector difference between the unchanged horizontal speed vector $\overrightarrow{V_2}$ of the second aircraft and the new horizontal speed vector $\overrightarrow{V_1^c}$ adopted by the first aircraft after the avoidance maneuver which is distinguished from the horizontal speed vector initial $\overrightarrow{V_1}$ of the first aircraft only by its orientation:

$$\overrightarrow{V_{rel}^c} = \overrightarrow{V_2} - \overrightarrow{V_1^c}$$

The new horizontal speed vector $V_{rel}^c$ of the second aircraft with respect to that of the first one, after execution of the avoidance maneuver by the first aircraft, is easily obtained by geometrical construction. Indeed, when it is linked to the location $X_2$ of the second aircraft, its end is necessarily at the point of intersection between the oriented straight line $\overrightarrow{X_2c}$ and the circle $C_2$ centered on the end f of a bound vector $\overrightarrow{X_2f}$ equal to the horizontal speed vector $\overrightarrow{V_2}$ of the second aircraft and having a radius equal to the modulus of the horizontal speed vector $\overrightarrow{V_1}$ of the first aircraft. The same geometrical construction gives the new horizontal speed vector $\overrightarrow{V_1^c}$ of the first aircraft after its avoidance maneuver.

The determining of the new headings $\overrightarrow{\Theta_{1b}}$ and $\overrightarrow{\Theta_{1c}}$, to be taken by the first aircraft after one or the other of the avoidance maneuvers to make the path of the second aircraft pass to one side or other of the sides of the angle at which it perceives the circle of protection $C_1$ of the first aircraft, can be done by geometrical construction solely on the basis of knowledge of the minimum permissible separation distance S for the two aircraft and the positions $X_1$ and $X_2$ and horizontal speed vectors $\overrightarrow{V_1}$ and $\overrightarrow{V_2}$ of the first and second aircraft.

The information on the position $X_1$ and the horizontal speed vector $\overrightarrow{V_1}$ proper to an aircraft are given to it by its on-board navigation equipment. The information pertaining to the positions $X_2$ and horizontal speed vectors $\overrightarrow{V_2}$ of the other aircraft moving in the vicinity of an aircraft may be obtained on board this aircraft by a technique of co-operation between aircraft, each aircraft sending the others its position and horizontal speed vector (or even, ultimately, its time of passage to the next rotating point) as is the case with TCAS equipment, or by a non-cooperative technique using onboard monitoring equipment such as a radar.

The new heading angle $\vec{\Theta_{1b}}$ that the first aircraft must take to bring the path of the second aircraft to the side $\overrightarrow{X_2b}$ of the angle at which it perceives the circle of security $C_1$ of the first aircraft, oriented as closely as possible to its horizontal speed vector $\vec{V_2}$, is by definition the oriented angle $(\overrightarrow{X_1N}, \vec{V_1^b})$, made by the new horizontal speed vector $\vec{V_1^b}$, acquired by the first aircraft following its avoidance maneuver, with the direction of the geographical north $\overrightarrow{X_1N}$:

$$\vec{\Theta_b} = (\overrightarrow{X_1N}, \vec{V_1^b})$$

This oriented angle may be expressed as a function of:

the heading $\vec{\psi}$ of the oriented straight line $\overrightarrow{X_1X_2}$ linking the position $X_1$ of the first aircraft with the position $X_2$ of the second aircraft:

$$\vec{\psi} = (\overrightarrow{X_1N}, \overrightarrow{X_1X_2})$$

the oriented angle $\vec{\alpha_b}$ existing between the oriented straight line $\overrightarrow{X_2X_1}$ linking the position $X_2$ of the second aircraft with the position $X_1$ of the first aircraft and the horizontal speed vector $\vec{V_{rel}^b}$, of the second aircraft relative to the first aircraft when the collision risks are resolved and when its path follows the oriented straight line $\overrightarrow{X_2b}$ indistinguishable from the side of the angle at which the second aircraft perceives the circle of protection $C_1$ of the first aircraft:

$$\vec{\alpha_b} = (\overrightarrow{X_2X_1}, V_{rel}^b) = (\overrightarrow{X_2X_1}, \overrightarrow{X_2b})$$

and of the oriented angle $\vec{\gamma_b}$ existing between the opposite $-\vec{V_{rel}^b}$ of the horizontal speed vector of the second aircraft relative to the first aircraft when the collision risks are resolved and when its path follows the oriented straight line $\overrightarrow{X_2b}$, which is undistinguishable from a side of the angle at which the second aircraft perceives the circle of protection $C_1$ of the first aircraft, and the horizontal speed vector $\vec{V_1^b}$ acquired by the first aircraft following its avoidance maneuver:

$$\vec{\gamma_b} = (-\vec{V_{rel}^b}, \vec{V_1^b}) = (\overrightarrow{bX_2}, g_b, f)$$

the point $g_b$ identifying the end of the horizontal speed vector $\vec{V_{rel}^b}$ of the second aircraft with respect to the first aircraft after resolution of the collision risks, when this vector is linked to the position $X_2$ of the second aircraft.

Indeed, owing to the properties of the oriented angles, we have the relationship:

$$(\overrightarrow{X_1N}, \vec{V_1^b}) = (\overrightarrow{X_1N}, \overrightarrow{X_1X_2}) + (\overrightarrow{X_1X_2}, \overrightarrow{X_2X_1}) + (\overrightarrow{X_2X_1}, \overrightarrow{X_2b}) + (\overrightarrow{X_2b}, \overrightarrow{bX_2}) + (\overrightarrow{bX_2}, \vec{V_1^b}) + 2k\pi$$

(k being an integer).
This relationship can also be written as follows:

$$\vec{\Theta_b} = \vec{\psi} + \pi + \vec{\alpha_b} + \pi + \vec{\gamma_b} + 2k\pi \qquad (2)$$

The oriented angles in the right-hand part of this angular relationship can all be determined from knowledge of the minimum separation distance allowed between two aircraft and of the positions and horizontal speed vectors of the two aircraft.

The heading $\vec{\psi_b}$ of the oriented straight line $\overrightarrow{X_1X_2}$ linking the position $X_1$ of the first aircraft to the position $X_2$ of the second aircraft is linked to the slope of this straight line which is known from the very fact that these two positions are known.

The oriented angle $\vec{\alpha_b}$ existing between the oriented straight line $\overrightarrow{X_2X_1}$ linking the position $X_2$ of the second aircraft to the position $X_1$ of the first aircraft and the horizontal speed vector $\vec{V_{rel}^b}$ of the second aircraft relative to the first aircraft when the risks of collision are resolved and when the path of the second aircraft follows the oriented straight line $\overrightarrow{X_2b}$, which is indistinguishable from a side of the angle at which the second aircraft perceives the circle of protection $C_1$ of the first aircraft, corresponds to the half-angle at which the second aircraft perceives the circle of protection $C_1$ of the first aircraft. With regard the way in which it is oriented, it has the following value:

$$\vec{\alpha_b} = -\arcsin\left(\frac{S}{\|\overrightarrow{X_1X_2}\|}\right) \qquad (3)$$

If we take account of the properties of the triangle $X_2$, $g_b$, f, the oriented angle $\vec{\gamma_b}$ may be expressed as a function of the oriented angle $\vec{\phi_b}$ existing between the horizontal speed vector $\vec{V_2}$ of the second aircraft and the oriented straight line $\overrightarrow{X_2b}$ identified with a side of the angle at which the second aircraft perceives the circle of protection $C_1$ of the first aircraft by the relationship:

$$\vec{\gamma_b} = \arcsin\left(\frac{\|\vec{V_2}\|}{\|\vec{V_1}\|}\sin(\varphi_b)\right) \qquad (4)$$

Now, the oriented angle $\vec{\phi_b}$ which has the following definition:

$$\vec{\phi_b} = (\vec{V_2}, \overrightarrow{X_2b})$$

may be expressed as a function:

of the heading $\vec{\theta_2}$ of the second aircraft:

$$\vec{\theta_2} = (\overrightarrow{X_2N}, \vec{V_2})$$

of the heading $\vec{\psi}$ of the oriented straight line $\overrightarrow{X_1X_2}$ joining the position $X_1$ of the first aircraft to the position $X_2$ of the second aircraft:

$$\vec{\psi} = (\overrightarrow{X_1N}, \overrightarrow{X_1X_2})$$

and of the oriented angle $\vec{\alpha_b}$:

$$\vec{\alpha_b} = (\overrightarrow{X_2X_1}, \overrightarrow{V_{rel}{}^b}) = (\overrightarrow{X_2X_1}, \overrightarrow{X_2b})$$

Indeed, owing to the properties of the oriented angles, we have the relationship:

$$(\vec{V_2}, \overrightarrow{X_2b}) = (\vec{V_2}, \overrightarrow{X_2N}) + (\overrightarrow{X_2N}, \overrightarrow{X_1X_2}) + (\overrightarrow{X_1X_2}, \overrightarrow{X_2X_1}) + (\overrightarrow{X_2X_1}, \overrightarrow{X_2b}) + 2k\pi$$

(k being an integer)
This relationship can also be written as follows:

$$\vec{\phi_b} = \vec{\theta_2} + \vec{\psi} + \pi + \vec{\alpha_b} + 2k\pi \quad (5)$$

Since the angles in the right-hand part of the above relationship can all be determined from the knowledge of the positions and horizontal speed vectors of the two aircraft, and from the minimum permissible separation distance between two aircraft, the angle $\vec{\phi_b}$ is determined too. Consequently, it is enough to make a trace-back to the previous relationships to be able to determine the value of the new heading $\overrightarrow{\Theta_{1b}}$ that the first aircraft must be made to adopt in order to eliminate the risks of collision by bringing the path of the second aircraft to the side $\overrightarrow{X_2b}$ of the angle at which it perceives the circle of protection of the first aircraft, this side $\overrightarrow{X_2b}$ being the closest in the orientation of its horizontal speed vector $\vec{V_2}$. This value of the new heading $\overrightarrow{\Theta_{1b}}$ is determined through the simple knowledge of the positions and horizontal speed vectors of the aircraft and the minimum permissible separation distance between two aircraft.

A similar process of reasoning is used to determine the value of the new heading $\overrightarrow{\Theta_{1c}}$ that the first aircraft must be made to adopt in order to eliminate the risks of collision by bringing the path of the second aircraft to the side $\overrightarrow{X_2c}$ of the angle at which it perceives the circle of protection of the first aircraft, this side $\overrightarrow{X_2c}$ being the furthest in orientation from its horizontal speed vector $\vec{V_2}$. The value of the new heading $\overrightarrow{\Theta_{1c}}$ is determined through the simple knowledge of the positions and horizontal speed vectors of the aircraft and the minimum permissible separation distance between two aircraft.

More precisely, the value of the new heading $\overrightarrow{\Theta_{1c}}$ which is defined by the oriented angle:

$$\vec{\Theta_c} = (\overrightarrow{X_1N}, \overrightarrow{V_1c})$$

may be expressed as a function of:

the heading $\vec{\psi}$ of the oriented straight line $\overrightarrow{X_1X_2}$ linking the position $X_1$ of the first aircraft with the position $X_2$ of the second aircraft:

$$\psi = (X_1N, X_1X_2)$$

the oriented angle $\vec{\alpha_c}$ existing between the oriented straight line $\overrightarrow{X_2X_1}$ linking the position $X_1$ of the first aircraft with the position $X_2$ of the second aircraft and the horizontal speed vector $\overrightarrow{V_{rel}{}^c}$ of the second aircraft relative to the position $X_2$ of the second aircraft when the collision risks are resolved and when its path follows the oriented straight line $\overrightarrow{X_2c}$ that is undistinguishable from the side of the angle at which the second aircraft perceives the circle of protection $C_1$ of the first aircraft:

$$\vec{\alpha_c} = (\overrightarrow{X_2X_1}, \overrightarrow{V_{rel}{}^c}) = (\overrightarrow{X_2X_1}, \overrightarrow{X_2c})$$

and of the oriented angle $\vec{\gamma_c}$ existing between the opposite $-\overrightarrow{V_{rel}{}^c}$ of the horizontal speed vector of the second aircraft relative to the first aircraft when the collision risks are resolved and when its path follows the oriented straight line $\overrightarrow{X_2c}$ which is undistinguishable from a side of the angle at which the second aircraft perceives the circle of protection $C_1$ of the first aircraft, and the horizontal speed vector $\overrightarrow{V_1c}$ acquired by the first aircraft following its avoidance maneuver:

$$\vec{\gamma} = (-\overrightarrow{V_{rel}{}^c}, \overrightarrow{V_1c}) = (\overrightarrow{cX_2}, \overrightarrow{g_cf})$$

the point $g_c$ identifying, in FIG. 2, the end of the horizontal speed vector $\overrightarrow{V_{rel}{}^c}$ of the second aircraft with respect to the first aircraft after resolution of the collision risks, when this vector is linked to the position $X_2$ of the second aircraft.

Indeed, owing to the properties of the oriented angles, we have the relationship:

$$(\overrightarrow{X_1N}, \overrightarrow{V_1c}) = (\overrightarrow{X_1N}, \overrightarrow{X_1X_2}) + (\overrightarrow{X_1X_2}, \overrightarrow{X_2X_1}) + (\overrightarrow{X_2X_1}, \overrightarrow{X_2c}) + (\overrightarrow{X_2c}, \overrightarrow{cX_2}, \overrightarrow{V_1c}) + 2k\pi$$

((k being an integer).
This relationship can also be written as follows:

$$\overrightarrow{\Theta_{1c}} = \vec{\psi} + \pi + \vec{\alpha_c} + \pi + \vec{\gamma_c} + 2k\pi \quad (6)$$

The angles in the right-hand part of this angular relationship can all be determined from knowledge of the minimum permissible separation distance between two aircraft and of the positions and horizontal speed vectors of the two aircraft.

The heading $\vec{\psi_b}$ of the oriented straight line $\overrightarrow{X_1X_2}$ linking the position $X_1$ of the first aircraft to the position $X_2$ of the second aircraft is related to the slope of this straight line which is known from the very fact that these two positions are known.

The oriented angle $\vec{\alpha_c}$, existing between the oriented straight line $\overrightarrow{X_2X_1}$ that links the position $X_2$ of the second aircraft to the position $X_1$ of the first aircraft and the horizontal speed vector $\overrightarrow{V_{rel}c}$ of the second aircraft relative to the first aircraft when the risks of collision are resolved and when the path of the second aircraft follows the oriented straight line $\overrightarrow{X_2c}$ that is indistinguishable from a side of the angle at which the second aircraft perceives the circle of protection $C_1$ of the first aircraft, corresponds to the half-angle at which the second aircraft perceives the circle of protection $C_1$ of the first aircraft. With regard to its direction of orientation, it has the following value:

$$\overrightarrow{\alpha_c} = \arcsin\left(\frac{S}{\|\overrightarrow{X_1X_2}\|}\right) \quad (7)$$

If we take account of the properties of the triangle $X_2$, $g_c$, f, the oriented angle $\overrightarrow{\gamma_c}$ may be expressed as a function of the oriented angle $\overrightarrow{\phi_c}$ existing between the horizontal speed vector $\overrightarrow{V_2}$ of the second aircraft and the oriented straight line $\overrightarrow{X_2c}$ indistinguishable from a side of the angle at which the second aircraft perceives the circle of protection $C_1$ of the first aircraft by the relationship:

$$\overrightarrow{\gamma_c} = \arcsin\left(\frac{\|\overrightarrow{V_2}\|}{\|\overrightarrow{V_1}\|}\sin(\overrightarrow{\varphi_c})\right) \quad (8)$$

It can be seen that the above relationship has no meaning unless the arc-sine exists, namely unless the inequality:

$$|\sin\overrightarrow{\varphi_c}|\frac{\|\overrightarrow{V_2}\|}{\|\overrightarrow{V_1}\|} < 1$$

is verified. As we have seen here above (relationship 1) it is the inequality that conditions the existence of the evasive heading $\overrightarrow{\Theta_{1c}}$. Thus it is possible not to verify the existence of the evasive heading $\overrightarrow{\Theta_{1c}}$ before it is determined since its non-existence naturally leads to a situation where it is impossible to determine the oriented angle $\overrightarrow{\gamma_c}$ which constitutes an indispensable step of the determining process.

Now, the oriented angle $\overrightarrow{\phi_c}$ which has the following definition:

$$\overrightarrow{\phi_c} = (\overrightarrow{V_2}, \overrightarrow{X_2c})$$

may be expressed as a function:

of the heading $\overrightarrow{\theta_2}$ of the second aircraft:

$$\overrightarrow{\theta_2} = (\overrightarrow{X_2N}, \overrightarrow{V_2})$$

of the heading $\overrightarrow{\psi}$ of the oriented straight line $\overrightarrow{X_1X_2}$ linking the position $X_1$ of the first aircraft to the position $X_2$ of the second aircraft:

$$\overrightarrow{\psi} = (\overrightarrow{X_1N}, \overrightarrow{X_1X_2})$$

and of the oriented angle $\overrightarrow{\alpha_c}$:

$$\overrightarrow{\alpha_c} = (\overrightarrow{X_2X_1}, \overrightarrow{V_{rel}c}) = (\overrightarrow{X_2X_1}, \overrightarrow{X_2c})$$

Indeed, owing to the properties of the oriented angles, we have the relationship:

$$(\overrightarrow{V_2}, \overrightarrow{X_2c}) = (\overrightarrow{V_2}, \overrightarrow{X_2N}) + (\overrightarrow{X_2N}, \overrightarrow{X_1X_2}) + (\overrightarrow{X_1X_2}, \overrightarrow{X_2X_1}) + (\overrightarrow{X_2X_1}, \overrightarrow{X_2c}) + 2k\pi$$

(k being an integer)
This relationship can also be written as follows:

$$\overrightarrow{\phi_c} = -\overrightarrow{\theta_2} + \overrightarrow{\psi} + \pi + \overrightarrow{\alpha_c} + 2k\pi \quad (9)$$

Since the angles in the right-hand part of the above relationship can all be determined from the knowledge of the positions and horizontal speed vectors of the two aircraft, and from the minimum permissible separation distance between two aircraft, the angle $\overrightarrow{\phi_c}$ is determined too. Consequently, it is enough to make a trace-back along the previous relationships to be able to determine the value of the new heading $\overrightarrow{\Theta_{1c}}$ that the first aircraft must be made to adopt in order to eliminate the risks of collision by bringing the path of the second aircraft to the side $\overrightarrow{X_2c}$ of the angle at which it perceives the circle of protection of the first aircraft, this side $\overrightarrow{X_2c}$ being the furthest, in orientation, from its horizontal speed vector $\overrightarrow{V_2}$, through the simple knowledge of the positions and horizontal speed vectors of the aircraft and the minimum permissible separation distance between two aircraft.

Once the first aircraft has adopted one of the two new heading values $\overrightarrow{\Theta_{1b}}$ or $\overrightarrow{\Theta_{1c}}$ thus determined, it is assured that the second aircraft will pass at a minimum distance at least equal to the stipulated distance S but it moves away from its initial route which it must home into at the earliest possible time without reviving risks of collision with the second aircraft.

Figure 3:
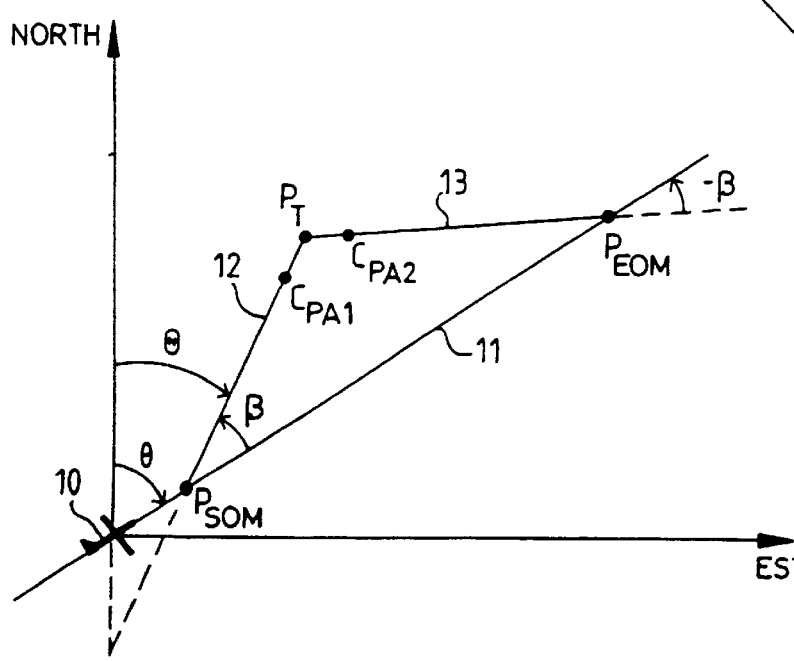
FIG. 3 is a graph illustrating the shape of an avoidance path according to the invention, enabling an aircraft describing a rectilinear portion of an initially planned route to resolve a traffic conflict with another aircraft and then home in on its initially planned route.

FIG. 3 is a drawing illustrating an exemplary full avoidance path by which an aircraft 10, travelling through a rectilinear segment 11 of an, initially planned route, firstly resolves a risk of collision with another aircraft and secondly homes in on this rectilinear segment 11 of the initially planned route at the cost of a minimum detour. This avoidance path consists of two successive rectilinear segments, a first evasive rectilinear segment 12 and a second homing rectilinear segment 13.

The first evasive rectilinear segment 12 gets detached from the straight segment 11 of the initially planned route at a point $P_{SOM}$ corresponding to the position of the aircraft at the beginning of the avoidance maneuver while a route conflict with a second aircraft giving rise to a medium-term risk of collision has been detected, one or two new heading values $\overrightarrow{\Theta_{1b}}$, $\overrightarrow{\Theta_{1c}}$ have been computed for the resolution of the collision risk and one of them has been chosen. Its heading diverges from the heading $\overrightarrow{\theta_1}$ of the rectilinear segment 11 of the initially planned route by an oriented angle $\overrightarrow{\beta}$ corresponding to the difference between the new heading value $\overrightarrow{\Theta_{1b}}$ or $\overrightarrow{\Theta_{1c}}$ adopted for the resolution of the collision risk and the value $\overrightarrow{\theta_1}$ of the heading of the straight segment 11 of the initially planned route:

$$\overrightarrow{\beta} = \overrightarrow{\Theta} - \overrightarrow{\theta}$$

The second homing rectilinear segment 13 gets detached from the first evasive rectilinear segment 12 at a rotating point $P_T$ and homes in on the straight segment 11 of the initially planned route at a homing point $P_{EOM}$. Its orientation is chosen so that there is a heading difference equal to $-\vec{\beta}$ with the heading of the straight segment 11 of the initially planned route.

Thus determined, the avoidance path follows the sides of an isosceles triangle whose base lies on the straight segment 11 of the initially planned route. It is entirely determined only when the position of the rotating point $P_T$ has been chosen.

The choice of the position of the rotating point $P_T$ meets the goal of placing the greatest possible limits on the length of the avoidance path without thereby reviving the risks of collision that led to this avoidance path.

Since the new heading adopted for the evasive rectilinear segment 12 has been determined to bring the path of the threatening aircraft to one side of the angle at which this threatening aircraft perceives the circle of protection of the maneuvering aircraft 10, the distance between the two aircraft will decrease during the routing of the aircraft 10 on the evasive rectilinear segment 12, until it reaches a point $C_{PA1}$ where its distance from the threatening aircraft goes through a minimum corresponding to the minimum permissible separation distance S between two aircraft. The position of this point $C_{PA1}$ is easily determined because, to reach it from the point $P_{SOM}$, the maneuvering aircraft 10, takes an amount of time $t_{CPA1}$. This amount of time, as can be seen in the graph of FIG. 1, corresponds to the time needed to travel the distance $X_2X_1$ with a speed equal to the projection, on the straight line $X_2X_1$ of the horizontal speed vector $\vec{V}_{rel}$ of the second aircraft relative to the first one:

$$t_{CPA} = \frac{\|\overrightarrow{X_1 X_2}\|^2}{\overrightarrow{X_1 X_2} \times (\overrightarrow{V_2} - \overrightarrow{V_1})} = -\left(\frac{\overrightarrow{X_1 X_2} \times (\overrightarrow{V_2} - \overrightarrow{V_1})}{\|\overrightarrow{V_2} - \overrightarrow{V_1}\|^2}\right)$$

$$P_{CPA} = P_{SOM} + t_{CPA} \cdot \overrightarrow{V_1}$$

The position of the rotating point $P_T$ on the first evasive rectilinear segment (12 FIG. 3) must be taken beyond the minimum separation point $P_{CPA}$, so as not to recreate new risks of collision with the same aircraft on the second homing rectilinear segment (13 FIG. 3). This is especially true as the aircraft would be in danger of immediate collision since the separation distance between the two aircraft is already close to the minimum permissible. It is determined so that the second aircraft does not penetrate the circle of security $C_1$ of the first aircraft, but is tangential to it when the first aircraft travels through the second homing rectilinear segment (13 FIG. 3) of its avoidance path.

Figure 4:
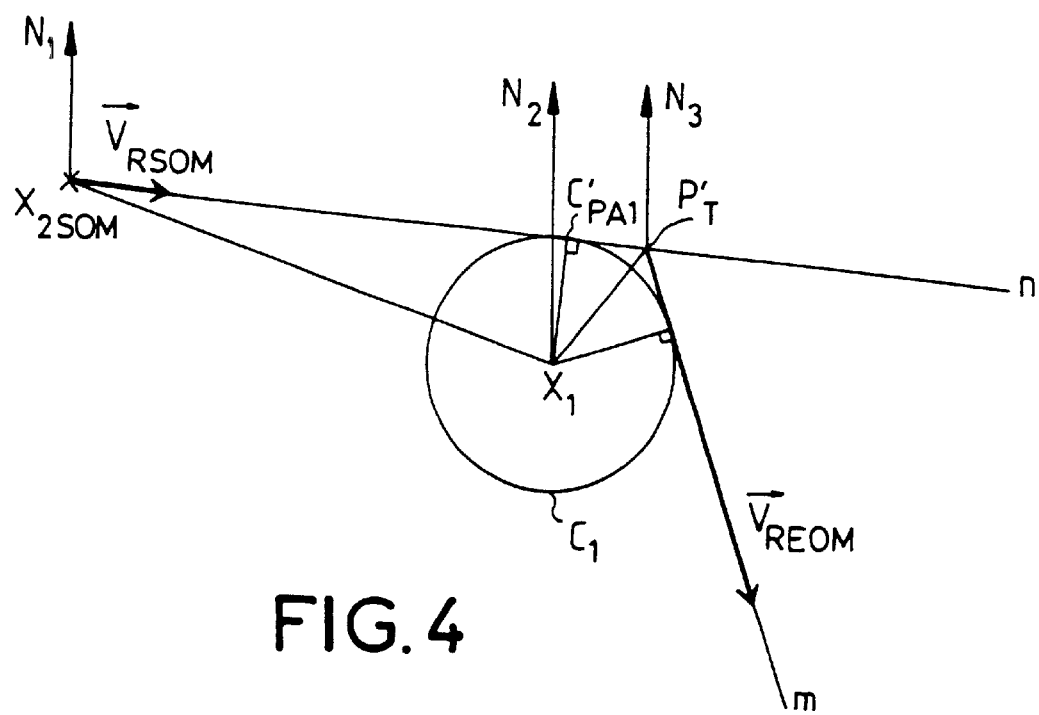
FIG. 4 is a graph explaining the determining of an avoidance path in the case where the aircraft, which has to make a diversion from its route and follow it, initially had a rectilinear route.

The determining of this position, as can be seen in the graph of FIG. 4, is done from a horizontal plane linked to the first aircraft and already adopted for FIGS. 1 and 2. In this depiction, the first aircraft has a fixed position $X_1$ and the second aircraft has a mobile position. When the first aircraft embarks on an avoidance path (position $P_{SOM}$ in FIG. 3), the second aircraft is at the position $X_{2SOM}$ and has a horizontal speed vector $\overrightarrow{V_{RSOM}}$ relative to the first aircraft. When the first aircraft travels through the first evasive rectilinear segment (12 FIG. 3) of its avoidance path, the second aircraft, moving at a constant relative speed $V_{RSOM}$, travels through the oriented straight line $\overrightarrow{X_{RSOM}n}$ tangential to the circle of protection $C_1$ of the first aircraft since the first aircraft has made the heading change necessary for this at the very outset ($P_{SOM}$ FIG. 3) of its avoidance path. The second aircraft travels through the oriented straight line $\overrightarrow{X_{RSOM}n}$ up to the fictitious rotating point $P_T'$ which corresponds to the point in time when the first aircraft makes a new change in heading to travel on the second homing rectilinear segment (13 FIG. 3) of its avoidance path. Beyond the fictitious rotating point, $P_T'$, the second aircraft has a new relative horizontal speed vector $\overrightarrow{V_{REOM}}$ and starts travelling through a new oriented straight line $\overrightarrow{P'_T m}$, at constant relative speed $\overrightarrow{V_{REOM}}$.

The point $P_T$ is chosen beyond the point $C_{PA1}$ where the second aircraft passes to the minimum permissible distance S from the first aircraft, so that the second homing rectilinear segment (13 FIG. 3) whose heading is arbitrarily fixed at the value $\vec{\Theta} - 2\vec{\beta}$ is in keeping with the minimum permissible separation distance S from the second aircraft. Its position is indirectly accessible by means of the position of the fictitious rotating point $P_T'$ which is reached at the same time by the second aircraft. Indeed, this fictitious rotating point $P_T'$ is at a known relative distance $D_{relPT}$ from the point $C'_{PA1}$ of the path of the second aircraft perceived from the first aircraft, corresponding to the minimum permissible separation distance between the two aircraft, travelled at a speed also known by the second aircraft.

The relative distance $D_{relPT}$ is known because it can be deduced from a trigonometric relationship that implements only variables deductible from the knowledge of the positions and horizontal speed vectors of the two aircraft, and from the knowledge of the value S of the minimum permissible separation distance between two aircraft. Indeed, the relative distance $D_{relPT}$ can be expressed by the relationship:

$$D_{relPT} = \|\overrightarrow{X_1 C'_{PA1}}\| \times \tan(\overrightarrow{C'_{PA1} X_1}, \overrightarrow{P_T X_1}) = S \times \tan(\overrightarrow{C'_{PA1} X_1}, \overrightarrow{P_T X_1})$$

Taking account of the inscribed and excribed angles, this relationship can be put in the following form $$D_{relPT} = S \times \tan\left(\frac{\delta}{2}\right)$$

with:

$$\vec{\delta} = \left(\overrightarrow{X_{2SOM}n}, \overrightarrow{P_T'm}\right)$$

The oriented angle $\vec{\delta}$, which is between, firstly, the route $\overrightarrow{X_{2SOM}n}$ followed by the second aircraft relative to the first aircraft while the first aircraft travels through the first evasive rectilinear segment (12 FIG. 3) of its avoidance path and, secondly, the route $P'_T m$ followed by the second aircraft relative to the first aircraft while the first aircraft travels through the second homing segment (13 FIG. 3), can be expressed as a function of the heading $\overrightarrow{\chi_{EOM}}$ of the route $P'_T m$. Indeed, we have the relationship between oriented angles:

$$(\overrightarrow{P_T N_3}, \overrightarrow{P_T m}) = (\overrightarrow{P_T N_3}, \overrightarrow{X_1 N_2}) + (\overrightarrow{X_1 N_2}, \overrightarrow{X_1 X_{2SOM}}) +$$
$$(\overrightarrow{X_1 X_{2SOM}}, \overrightarrow{X_{2SOM} X_1}) + (\overrightarrow{X_{2SOM} X_1}, \overrightarrow{X_{2SOM} n}) + (\overrightarrow{X_{2SOM} n}, \overrightarrow{P_T m}) + 2k\pi$$

which is also written as follows:

$$\overrightarrow{\chi_{EOM}} = 0 + \overrightarrow{\psi_{SOM}} + \pi + \overrightarrow{\alpha_{SOM}} + \vec{\delta} + 2k\pi$$

$\overrightarrow{\psi_{SOM}}$ being the heading of the oriented segment $\overrightarrow{X_1 X_{2SOM}}$ and $\overrightarrow{\alpha_{SOM}}$ being the oriented angle $(\overrightarrow{X_{2SOM} X_1}, \overrightarrow{X_{2SOM} n})$, so that we have:

$$\vec{\delta} = \overrightarrow{\chi_{EOM}} - (\overrightarrow{\psi_{SOM}} + \pi + \overrightarrow{\alpha_{SOM}})$$

The relative distance $D_{relPT}$ between the rotating point $P_T'$ of the point $C_{PA1}$ in a horizontal plane linked to the first aircraft can therefore be expressed by the relationship:

$$D_{relPT} = S \times \tan\left(\frac{\overrightarrow{\chi_{EOM}} - (\overrightarrow{\psi_{SOM}} + \pi + \overrightarrow{\alpha_{SOM}})}{2}\right)$$

which enables it to be determined solely from a knowledge of the positions and horizontal speed vectors of the two aircraft, and from the minimum permissible separation distance between two aircraft.

The time $t_{PT}$ taken by the second aircraft to travel the relative distance $D_{relPT}$ at the speed $V_{RSOM}$, can, in its turn, be deduced purely from the knowledge of the positions and horizontal speed vectors of the two aircraft, and from the minimum permissible separation distance between two aircraft since it is equal to:

$$t_{PT} = \frac{D_{relPT}}{\|\overrightarrow{V_{RSOM}}\|}$$

with:

$$\overrightarrow{V_{RSOM}} = \vec{V_2} - \overrightarrow{V_{1SOM}}$$

$\overrightarrow{V_{1SOM}}$ being the horizontal speed vector of the first aircraft on the first rectilinear segment (12 FIG. 3) of its evasive path. It is used to estimate the position of the rotating point $P_T$ beyond the point $C_{PA1}$ of the first evasive rectilinear segment (12 FIG. 3) since it is reached by the first aircraft animated by a speed $V_{1SOM}$ for a period of time $t_{PT}$ after the point $C_{PA1}$:

$$D_{PT} = \|P_T - C_{PA1}\| = t_{PT} \times \|\overrightarrow{V_{1SOM}}\|$$

This ultimately gives us the expression used to compute the length of the first evasive rectilinear segment (12 FIG. 3) of the avoidance path of the first aircraft and hence the position of the rotating point $P_T$:

$$\overrightarrow{X_{PT}} = -\left(\frac{(\overrightarrow{X_{1SOM} X_{2SOM}}) \times (\vec{V_2} - \overrightarrow{V_{1SOM}})}{\|\vec{V_2} - \overrightarrow{V_{1SOM}}\|^2}\right) \times \|\overrightarrow{V_{1SOM}}\| + \qquad (10)$$

$$S \times \tan\left(\frac{\overrightarrow{\chi_{EOM}} - (\overrightarrow{\psi_{SOM}} + \pi + \overrightarrow{\alpha_{SOM}})}{2}\right) \frac{\|\overrightarrow{V_{1SOM}}\|}{\|\vec{V_2} - \overrightarrow{V_{1SOM}}\|^2}$$

Figure 5:
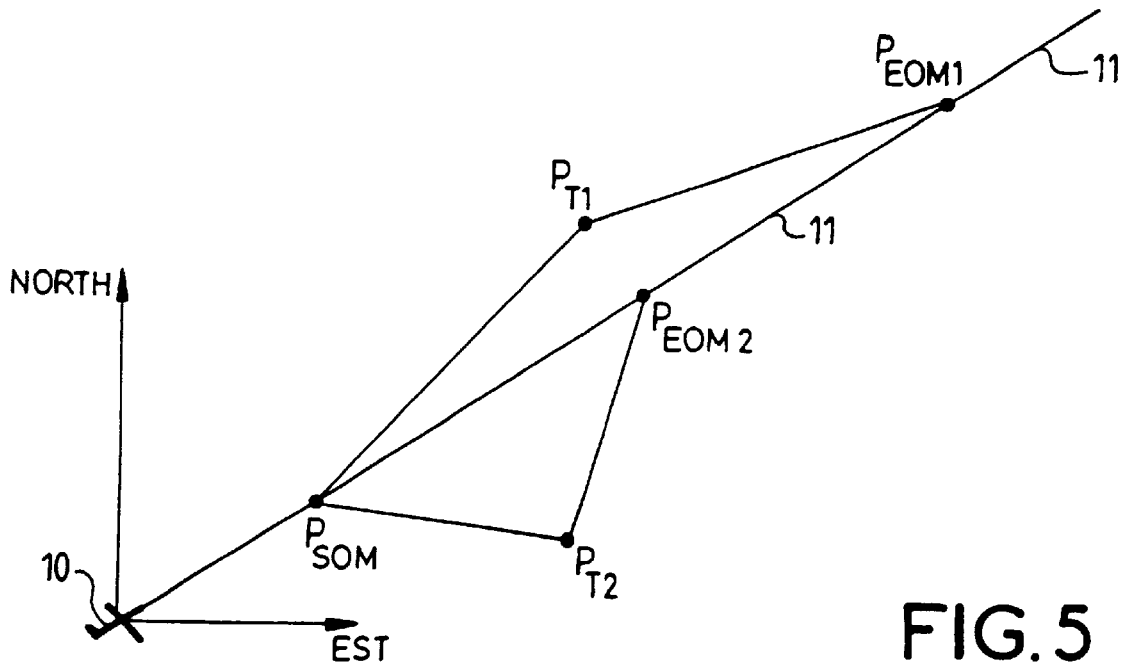
FIG. 5 is a graph illustrating the choice of an avoidance path when two avoidance paths are possible

In the more general case of the resolution of medium-term risks, it is possible to determine two new heading values $\overrightarrow{\Theta_{1b}}$ and $\overrightarrow{\Theta_{1c}}$ by which the first aircraft can evade the risk of collision by a route diversion, either to one side or to the other side of its initially planned route. It is then necessary to choose between these two possibilities of route diversion which lead to two different avoidance paths. The choice is made by searching for a new heading value which leads to the route diversion FIG. 5 illustrates the procedure for making such a choice when the avoidance paths have a homing part consisting of a rectilinear segment of the same length as the rectilinear segment constituting their first evasive part. Indeed, while it is possible to give other forms to the second homing part of the avoidance path, it is preferred to give it this shape which has already been considered with respect to FIG. 3, because it is well-suited to the resolution of medium-term risks of collision encountered while the first aircraft is travelling through the rectilinear section of its initially planned route, which is the case most frequently encountered in the Free Flight technique. Thus, an avoidance path follows the sides (12, 13 FIG. 3) of an isosceles triangle whose base rests on the rectilinear segment (12 FIG. 3) of the initially planned route.

FIG. 5 shows the rectilinear section 11 of the initially planned route through which the first aircraft 10 is travelling at a time when there is a medium-term risk of collision. To resolve this risk, it is planned to make a route diversion at the point $P_{SOM}$ of its original route, either to portside to follow an avoidance path passing through a rotating point $P_{T1}$ and joining up with the initial route at an end-of route-diversion point $P_{EOM1}$, or portside to follow an avoidance path passing through another rotating point $P_{T2}$ and joining up with the initial route at another point of the route diversion $P_{EOM2}$.

The two avoidance paths, namely portside and starboard, are perfectly defined by their shapes along the sides of an isosceles triangle, by the headings of their first evasive part determined by means of the relationships (2 to 5) and (6 to 9) and by the lengths of the two segments that form them. These lengths are equal to the distances of their rotating points $P_{T1}$, and $P_{T2}$ respectively, from the starting point $P_{SOM}$ of the route diversion maneuver, determined by means of the relationship (10). The choice between these two paths is made so as to reduce the lengthening of the initially planned route as much as possible. To be able to do this, it is enough to compute the lengths of the two trajectories that go from the maneuver starting point of the $P_{SOM}$ to the homing point $P_{EOM1}$ or $P_{EOM2}$ that is at the greatest distance on the initial route, one trajectory taking the portside avoidance path and the other trajectory taking the starboard avoidance path, and to compute the avoidance paths giving the shortest trajectory.

In FIG. 5, the criterion of a minimum lengthening of the initially planned route leads to preferring the portside avoidance path $P_{SOM}$, $P_{T1}$, $P_{EOM1}$ to the starboard avoidance path $P_{SOM}$, $P_{T2}$, $P_{EOM2}$ but this criterion is not an absolute one because cases may arise where the avoidance path leading to the minimum lengthening of the initially planned route is not practicable because it entails risks of collision with a third aircraft or because it passes through a zone to be avoided, for example of stormy zone.

Figure 6B:
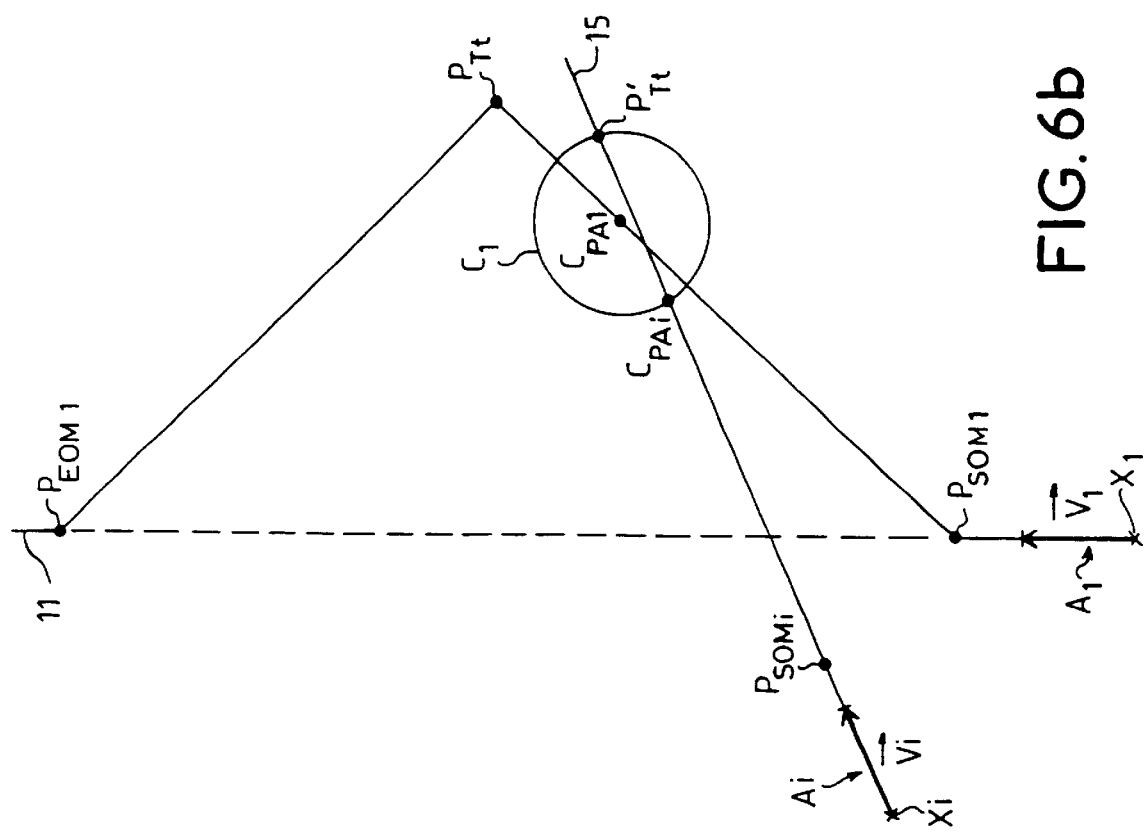
FIGS. 6a and 6b are graphs showing a practical case of resolution of a situation of traffic conflict between two aircraft when one of them takes an avoidance path prepared by following the method according to the invention.
Figure 6A:
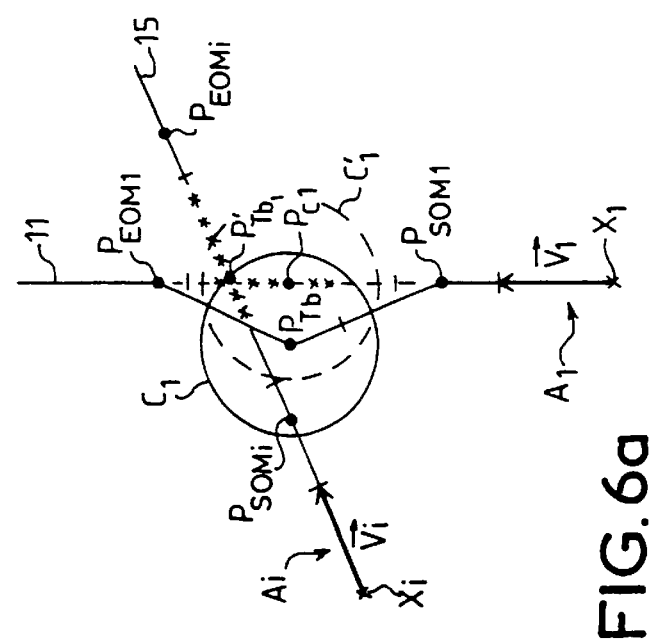

The graphs of FIGS. 6a and 6b plotted in a horizontal plane with respect to an absolute reference system, show a practical example of traffic conflict resolution. Two aircraft $A_1$ and $A_i$ follow concurrent initial routes 11 and 15 respectively, one aircraft $A_1$ with a horizontal speed vector $\vec{V_1}$, and the other aircraft $A_i$ with a horizontal speed vector $\vec{V_i}$. While the aircraft $A_1$ is on its initial route 11, at the position $X_1$, and the aircraft $A_i$ is on its initial route 15, at the position $X_i$, the aircraft $A_1$ is warned of traffic conflict with the aircraft $A_i$ and of the fact that it has no right of way and that it must resolve this conflict. Indeed, if neither of the two aircraft modifies its route and its speed vector, they will find themselves, on the parts of their routes 11 and 15 represented by crosses, with a separation distance smaller then the permissible distance S identified in FIG. 6a by circles $C_1$, $C_1'$. For example, when the aircraft $A_1$ is at the point $P_{C1}$, on the part of this route 11 represented by small crosses, the aircraft $A_1$ is at the point $P_{Tb}'$ of its route 15, inside its circle of protection $C_1'$ represented by a dashes. It is assumed that the aircraft $A_1$ has two possible avoidance paths available to resolve this route conflict, one taking a starboard path and the other taking a portside path, that is to say that the situation is one of a conflict of routes verifying the inequality (1).

FIG. 6a illustrates the portside avoidance path by which the aircraft $A_1$ is made to go behind the aircraft $A_i$. This is done by curving the route of the aircraft $A_1$ toward the initial position $X_i$ of the aircraft $A_i$. This portside avoidance trajectory consists of a first rectilinear evasive part joining the maneuver starting point $P_{SOM1}$ to a rotating point $P_{Tb}$ placed to portside of the initial route and a second homing rectilinear part for homing into the initial route 11 joining the rotating point $P_{Tb}$ to a point $P_{EOM1}$ of the initial route 11. On the first evasive part, the distance between the two aircraft $A_1$ and $A_i$ diminishes until, in the vicinity of the rotating point $P_{Tb}$ (to be precise the point $C_{PA1}$ shown in FIG. 3), it becomes a minimum that remains above the minimum permissible separation distance S. On the second homing part for homing into the initial route, the distance between the two aircraft $A_1$ and $A_i$ starts increasing fairly quickly (to be precise, from a point $C_{PA2}$ neighboring the rotating point $P_{Tb}$ shown in FIG. 3) averting any risk of a revival of the conflict of route. The circle of protection $C_1$ plotted in an unbroken line when the aircraft $A_1$ and $A_i$ are at their closest to the aircraft $A_1$ in the vicinity of the rotating point $P_{Tb}$ and the aircraft $A_i$ in the vicinity of the point $P_{Tb}'$ shows that the minimum distance between the two aircraft remains always greater than the minimum permissible separation distance.

FIG. 6b illustrates the starboard avoidance path by which the aircraft $A_1$ is made to go ahead of the aircraft $A_i$. This is done by curving the route of the aircraft $A_1$ in a direction opposite that of the initial position $X_i$ of the aircraft $A_i$. This starboard avoidance trajectory consists of a first rectilinear evasive part joining the start-of-maneuver point $P_{SOM1}$, to a rotating point $P_{Tb}$ placed to portside of the initial route and a second homing rectilinear part for homing into the initial route 11 joining the rotating point $P_{Tb}$ to a point $P_{EOM1}$ of the initial route 11. This starboard avoidance path also maintains the distance between the two aircraft at a value greater than the minimum permissible separation distance. It appears to be surer than the portside avoidance path since, from the very outset, it further slows down the rate of reduction of the distance between the two aircraft. In fact, it is more dangerous because it implies a bumping race with the other aircraft in order to overtake it. This bumping race can be won only if the test based on the inequality (1) is positive, and it most usually leads to a major detour. It will often be eliminated, during the choice based on the minimum detour but can be chosen all the same when the other avoidance path, although it is shorter, raises problems such as that of passage through undesired zones or the creation of traffic conflict with other aircraft also in the vicinity. In any case, there are times when it is the shortest path, for example, when the geometry of the initial conflict is greatly shifted off-axis to portside with paths that converge more slowly.

Figure 7:
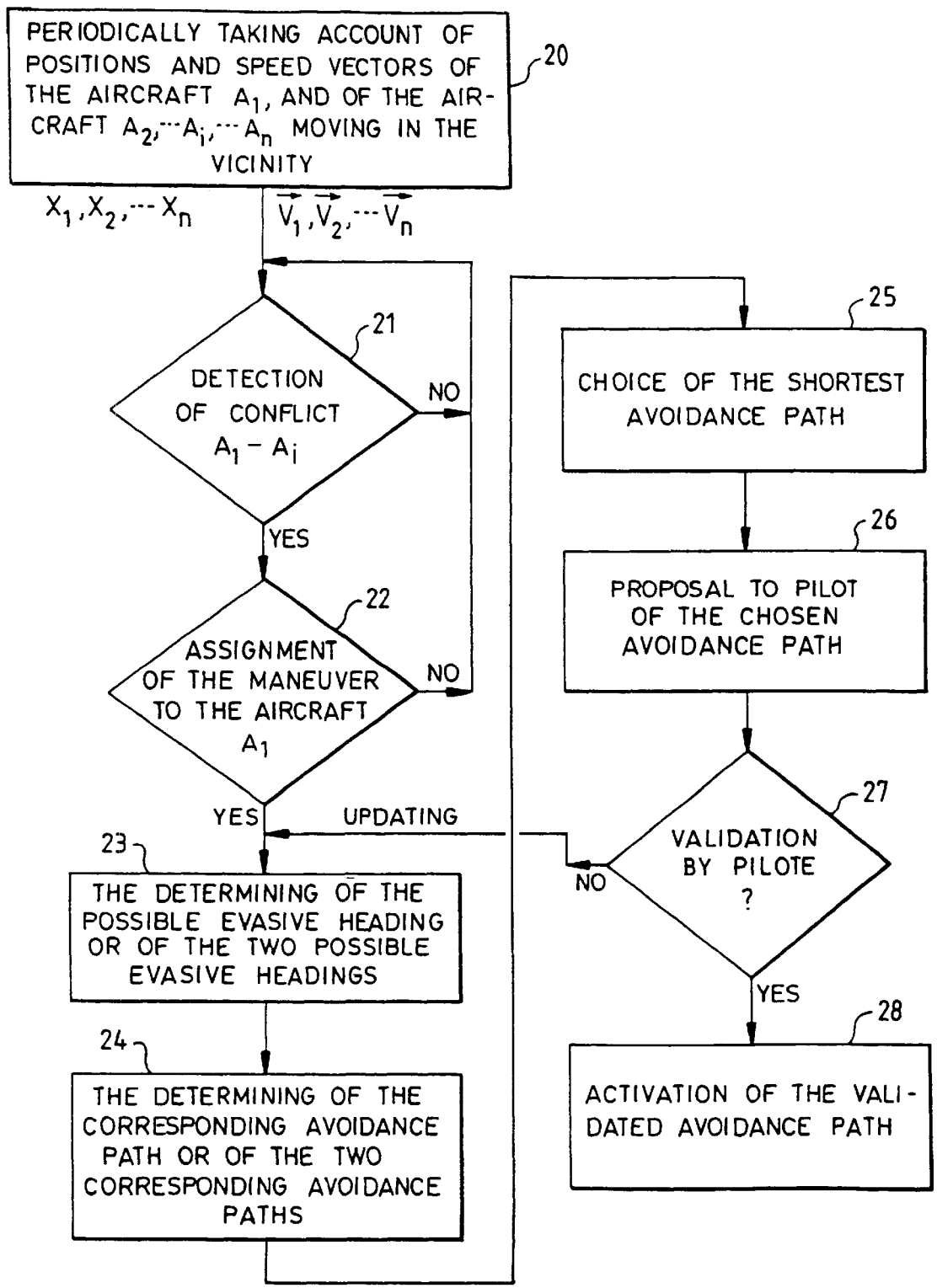
FIG. 7 is a flow chart summarizing the main steps of the method according to the invention.

FIG. 7 is a flow chart summarizing the main steps of the method that has just been described during its implementation on board an aircraft $A_1$, for the resolution of traffic conflicts or medium-term risks of collision with other aircraft $A_2, \ldots, A_i, \ldots, A_n$ moving in the vicinity.

The first step 20 consists in periodically taking account of the flight level, the position $X_1$ and the horizontal speed vector $\vec{V_1}$ of the aircraft $A_1$ considered, which are delivered by the onboard navigation equipment of this aircraft $A_1$, and the flight levels, the positions $X_2, \ldots, X_i \ldots, X_n$ and the horizontal speed vectors $\vec{V_2}, \ldots, \vec{V_i}, \ldots, \vec{V_n}$ of the other aircraft $A_2, \ldots, A_i \ldots, A_n$ moving in the vicinity of this aircraft $A_1$, which may be given by any means but above all by an piece of equipment of the TCAS type with enhanced sensitivity mounted on board the aircraft $A_1$.

The second step 21 consists of the detection of traffic conflicts, namely of the aircraft $A_2, \ldots, A_i \ldots, A_n$ located at the same flight level as the aircraft $A_1$ considered which, owing to their relative horizontal speed vectors with respect to the aircraft $A_1$ considered, are liable to approach it at distances smaller than the minimum permissible distance to provide for safety of the traffic. As indicated here above, this detection of traffic conflict is done by examining whether the oriented straight lines bearing the horizontal speed vectors of the aircraft $A_2, \ldots, A_i \ldots, A_n$ which move at the same flight level as the aircraft $A_1$ considered, measured relative to this aircraft, intercept a circle of protection whose center is this aircraft $A_1$ and whose radius is the minimum permissible separation distance.

The third step 22 consists of the application, as soon as a conflict is detected between the aircraft considered $A_1$ and another aircraft $A_i$ moving in the vicinity, at the same flight level as itself, of the navigation rules in force to find out which aircraft is responsible for carrying out the avoidance maneuver to resolve this conflict.

The fourth step 23 consists of the determining, as soon as the aircraft $A_1$ considered is assigned the task of performing an avoidance maneuver to resolve traffic conflicts with another aircraft $A_i$, of whether there are one or two possible evasive headings by application of the inequality (1), and then the determining the values of the heading or of the two headings that are effectively possible for an evasion by means of the relationships (2 to 9).

The fifth step 24 consists in determining an avoidance path for each heading effectively possible for evasion obtained during the preceding step, this avoidance path enabling both the resolution of the conflict being processed and the homing in on to the initially planned route, this avoidance path being built in two parts: a first evasive part constituted by a rectilinear segment having the possible heading for an evasion considered and going from a point $P_{SOM}$ of the initial route adopted for the start of the avoidance maneuver to a rotating point $P_{Td}$ determined by means of the relationship (10), and a second homing part that goes from this rotating point $P_T$ to a homing point $P_{EOM}$ on the initial route located downline from the start-of-avoidance-maneuver point $P_{SOM}$.

The sixth step 25 consists in making a choice, when two avoidance paths have been determined during the preceding step for the resolution of one and the same conflict, of the path corresponding to the shortest detour, this choice being made on the basis of the comparison of the lengths of the two paths leading from the point $P_{SOM}$ of the initial route adopted for the start of the avoidance maneuver to the most distant homing point $P_{EOM}$ on to the initial route, each of these two paths passing through one of the avoidance paths while at the same time meeting certain geographical and traffic constraints.

The seventh step consists of the presentation to the pilot, at the same time as a warning of the existence of traffic conflicts or shortly afterwards, of a proposal of a preferred avoidance path.

The eighth step 27 consists of a wait for a validation, by the pilot, of the avoidance path proposed in the previous step with a periodic updating both of the start-of-maneuver point $P_{SOM}$, which is moved so as to remain in front of the aircraft on its initial route and of the proposed avoidance path so that it still corresponds to the current situation.

The ninth step 28 consists of the adoption, after the pilot has validated the proposed avoidance path, of this avoidance path for an operation of tracking by an automatic pilot under the control of a flight management computer.

As a variant, during the fourth step 23, it is not determined whether there are one or two evasive headings possible but two evasive headings are determined systematically in taking the risk that one of the two determined headings will be aborted.

The onboard aircraft flight management computer, whose essential function is to give the automatic pilot the speed, heading and altitude instructions by which the aircraft follows an initially planned route, advantageously takes charge of the execution of the method of aircraft traffic conflict resolution just described as a background task. As soon as the pilot validates an avoidance path, he incorporates it into the route to be followed by modifying the instructions that he gives to the automatic pilot accordingly. This avoids the need for manual piloting of the aircraft for the resolution of a traffic conflict.

In conclusion, the avoidance maneuver described here above:

- Maintains the authorized separation distances between aircraft to the utmost extent, to the greatest advantage of air-traffic safety.
- Minimizes the value of the heading changes for the highest degree of passenger comfort
- Minimizes the number of heading changes to ensure the highest level of comfort for the operators (pilots and controllers in charge of monitoring)
- minimizes the lengthening of the path and hence loss in time and excess fuel consumption
- Minimizes the route diversions with respect to the initial route for the greater benefit of traffic stability (minimizing the risk of the domino effect) and of security with respect to whether or geographical phenomena.
- Can easily be automated because it takes the form of the insertion of three additional rotating points in the initial flight plan of the flight management.

Furthermore, the determining of the avoidance path proposed to the pilot, which is done explicitly in making use of no iterative process whatsoever, takes a relatively constant execution time. This means that it is easy to guarantee a maximum execution time. This property is a decisive element in the context of operational acceptability of an onboard separation system because the system in charge of the resolution may be sized to guarantee a given ratio between the latency time existing from the detection of a conflict up to the instant when the conflict becomes critical, and the time needed for the resolution of the conflict.

What is claimed is:

1. Method for preparation of an avoidance path in a horizontal plane, for a first aircraft following an initial route, to resolve a conflict of traffic with a second aircraft following a second route that may be identical to the first route, based on knowledge (a) of a minimum safety distance S to be maintained between the first and second aircraft, (b) of current positions $X_1$ and $X_2$ of the first and second aircraft, and (c) of horizontal speed vectors $\vec{V}_1$ and $\vec{V}_2$ of the first and second aircraft, said method comprising:

determining a horizontal speed vector $\vec{V}_{rel}$ of the second aircraft relative to the first aircraft;

determining, in the horizontal plane, a circle of protection around the first aircraft with the minimum safety distance as its radius;

testing an intersection of a straight line bearing the horizontal speed vector $\vec{V}$ hd relof the second aircraft with respect to the first aircraft, with the circle of protection of the first aircraft;

further comprising, in an event the intersection of the circle of protection of the first aircraft by the horizontal speed vector $\vec{V}_{rel}$ of the second aircraft relative to the first aircraft, implying a risk of collision, tests affirmative;

determining an angle $\vec{\alpha}_b$–$\vec{\alpha}_c$ at which the second aircraft perceives the circle of protection of the first aircraft;

determining a start-of-avoidance-maneuver point located on the initial route of the first aircraft and shifted downline from the current position $X_1$ of the first aircraft;

determining at least one value of heading angle $\vec{\Theta}_{1b}$ and/or $\vec{\Theta}_{1c}$ to be followed by the first aircraft, without changing a horizontal speed modulus, to bring the horizontal speed vector $\vec{V}_{rel}$ of the second aircraft relative to the first aircraft at most on one of sides $\vec{X}_2 b$, $\vec{X}_2 c$ of the angle at which the second aircraft perceives the circle of protection of the first aircraft; and determining at least one collision-risk avoidance path for the first aircraft comprising a first evasive path constituted by a rectilinear segment having the start-of-avoidance-maneuver point as its point of origin, one of new values of the obtained heading angle $\vec{\Theta}_{1b}$ or $\vec{\Theta}_{1c}$ as its heading and having, as its end, a rotating point chosen beyond a point where the separation distance between the first and second aircraft passes through a minimum value equal to a minimum safety distance, and, beyond the rotating point, a second homing path to the initial route.

2. Method according to claim 1, wherein the determining at least one new value of heading angle comprises:

comparatively testing an oriented angle existing between the horizontal speed vector $\vec{V}_2$ of the second aircraft and the side $\vec{X}_2 b$ of the sides $\vec{X}_2 b$, $\vec{X}_2 c$ of the angle at which the second aircraft perceives the circle of protection of the first aircraft, whose orientation is at a greatest distance from that of the horizontal speed vector $\vec{V}_2$ of the second aircraft:

$$\vec{\Phi}_c = (\vec{V}_2, \vec{X}_2 c)$$

said test verifying the inequality:

$$|\sin\overrightarrow{\varphi_c}| < \frac{\|\overrightarrow{V_1}\|}{\|\overrightarrow{V_2}\|}$$

and, if the inequality is not verified, determining a single value of heading angle $\overrightarrow{\Theta}_{1b}$ to be followed by the first aircraft, without changing a modulus of its horizontal speed vector to bring the horizontal speed vector $\overrightarrow{V}_{rel}$ of the second aircraft relative to the first aircraft to the side $\overrightarrow{X}_2b$ of the angle at which the second aircraft perceives the circle of protection of the first aircraft, whose orientation is closest to that of the horizontal speed vector $\overrightarrow{V}_2$ of the second aircraft; and, if the inequality is verified, determining two new values of heading angle $\overrightarrow{\Theta}_{1b}$ and $\overrightarrow{\Theta}_{1c}$ to be followed by the first aircraft, without changing its horizontal speed modulus to bring the horizontal speed vector $\overrightarrow{V}_{rel}$ of the second aircraft relative to the first aircraft to one of the sides $\overrightarrow{X}_2b$, $\overrightarrow{X}_2c$ of the angle at which the second aircraft perceives the circle of protection of the first aircraft, one of the first and second aircraft on one side $\overrightarrow{X}_2b$, another of the first and second aircraft on another side $\overrightarrow{X}_2c$.

3. Method according to claim 1, wherein, if more than one new value of heading angle $\overrightarrow{\Theta}_{1b}$ and $\overrightarrow{\Theta}_{1c}$ to be followed by the first aircraft, without changing its horizontal speed modulus to bring the horizontal speed vector $\overrightarrow{V}_{rel}$ of the second aircraft relative to the first aircraft to one of the sides $\overrightarrow{X}_2b$, $\overrightarrow{X}_2c$ of the angle at which the second aircraft perceives the circle of protection of the first aircraft, has been determined during the determining at least one new value of heading angle, the step for determining at least one avoidance path includes determining two avoidance paths, one avoidance path for each of the two new values of heading angle $\overrightarrow{\Theta}_{1b}$ and $\overrightarrow{\Theta}_{1c}$.

4. Method according to claim 1, wherein, when the determining at least one avoidance path leads to determining more than one avoidance path, the method further comprises selecting the avoidance path to be implemented, including making a choice, from among the avoidance paths determined, of the path that minimizes a lengthening of the initial route of the first aircraft.

5. Method according to claim 1, wherein the at least one avoidance path determined during the determining at least one avoidance path comprises a second homing part for homing into the initial route, starting, from a rotating point marking an end of a first evasive part of the at least one avoidance path, with a rectilinear segment following a new heading which, with respect to a heading of the initial route, has an angular divergence opposite to that of the rectilinear segment of the first evasive part of the at least one avoidance path.

6. Method according to claim 5, wherein the rotating point that makes a transition, within said avoidance part, between an end of the rectilinear segment of the first evasive part and the rectilinear segment staffing a second homing part of the initial route, is chosen, on the rectilinear segment of the first evasive part, so that the rotating point is sufficiently distant from a point where a separation distance between the first and second aircraft passes through a minimum distance equal to the minimum safety distance so that the separation distance between the first and second aircraft does not go below the minimum safety distance, by the first aircraft, on the rectilinear segment starting the second homing part of the at least one avoidance path.

7. Method according to claim 1, wherein a modulus of half-angle $\|\overrightarrow{\alpha}_b\|$ or $\|\overrightarrow{\alpha}_c\|$ at which the second aircraft perceives the circle of protection of the first aircraft is deduced from relationship:

$$\|\overrightarrow{\alpha_b}\| = \|\overrightarrow{\alpha_c}\| = \arcsin\left(\frac{S}{\|\overrightarrow{X_1 X_2}\|}\right).$$

8. Method according to claim 1, wherein the determining of a new value of heading angle $\overrightarrow{\Theta}_{1j}$ be followed by the first aircraft, without changing a horizontal speed modulus, to bring the horizontal speed vector $\overrightarrow{V}_{rel}$ of the second aircraft relative to the first aircraft on one of the sides $\overrightarrow{X}_2b$ or $\overrightarrow{X}_2c$, as an envisaged side $\overrightarrow{X}_2j$, of the angle at which the second aircraft perceives the circle of protection of the first aircraft, is obtained by application of an angular relationship that links the new value of heading angle $\overrightarrow{\Theta}_{1j}$ to:

a heading $\overrightarrow{\Psi}$ of an oriented straight line linking the position $X_1$ of the first aircraft to the position $X_2$ of the second aircraft, a half-angle $\overrightarrow{\alpha}_j$ at which the second aircraft perceives the circle of protection of the first aircraft, oriented from a bisector of the angle at which the second aircraft perceives the circle of protection of the first aircraft constituted by oriented straight line $\overrightarrow{X_2 X_1}$ linking the position $X_2$ of the second aircraft to the position $X_1$ of the first aircraft, towards the envisaged side $\overrightarrow{x}_2j$ of the angle at which the second aircraft perceives the circle of protection of the first aircraft, and an oriented angle $\overrightarrow{\gamma}_j$ made by the envisaged side $\overrightarrow{X}_2j$ of the angle at which the second aircraft perceives the circle of protection of the first aircraft, with a new vector $\overrightarrow{V}_1^j$ sought for a horizontal speed of the first aircraft to eliminate a risk of collision, this angular relationship being expressed by relationship:

$$\overrightarrow{\Theta}_{1j} = \overrightarrow{\Psi} + \overrightarrow{\alpha}_j + \overrightarrow{\gamma}_j + 2k\pi$$

wherein k is an integer, a horizontal speed vector $\overrightarrow{V}_{rel}^j$ of the second aircraft with respect to the first aircraft, when it travels through the envisaged side $\overrightarrow{X}_2j$ of the angle at which the second aircraft perceives the circle of protection of the first aircraft, is equal to a difference between the horizontal speed vector $\overrightarrow{V}_2$ of the second aircraft and the vector sought $\overrightarrow{V}_1^j$ for the horizontal speed of the first aircraft which, by assumption, has a same modulus as the horizontal speed vector $\overrightarrow{V}_1$ of the first aircraft:

$$\begin{cases} \vec{V}_{rel}^j = \vec{V}_2 - \vec{V}_1^j \\ \|\vec{V}_1^j\| = \|\vec{V}_1\| \end{cases}$$

the half-angle $\vec{\alpha}_j$ at which the second aircraft perceives the circle of protection of the first aircraft, oriented from a bisector of a solid angle constituted by the oriented straight line $\overrightarrow{X_2X_1}$ linking the position $X_2$ of the second aircraft to the position $X_1$ of the first aircraft, towards the envisaged side $\vec{X}_2j$ of the angle at which the second aircraft perceives the circle of protection of the first aircraft, has value:

$$\vec{\alpha}_j = \pm \arcsin\left(\frac{S}{\|\overrightarrow{X_1X_2}\|}\right)$$

the oriented angle $\vec{\gamma}_j$ made by the envisaged side $\vec{X}_2j$ of the angle at which the second aircraft perceives the circle of protection of the first aircraft, with the new vector $\vec{V}_{1j}$ sought for the horizontal speed of the first aircraft to eliminate a risk of collision, is expressed as a function of the angle $\vec{\phi}_j$ oriented between the horizontal speed vector $\vec{V}_2$ of the second aircraft and the envisaged side $\vec{X}_2j$ of the angle at which the second aircraft perceives the circle of protection, of the first aircraft, by relationship:

$$\vec{\gamma}_j = \arcsin\left(\frac{\|\vec{V}_2\|}{\|\vec{V}_1\|}\sin(\vec{\phi}_j)\right)$$

wherein an absence of definition of the arcsin signifies an impossibility of determining the new value of heading angle $\vec{\Theta}_{1j}$ sought, and the oriented angle $\vec{\Theta}_j$ between the horizontal speed vector $\vec{V}_2$ of the second aircraft and the side envisaged $\vec{X}_2j$ of the angle at which the second aircraft perceives the circle of protection of the first aircraft, is expressed by relationship:

$$\vec{\phi}_j = \vec{\Psi} = \vec{\alpha}_j - \vec{\Theta}_2 + \pi + 2k\pi$$

the oriented angle $\vec{\Theta}_2$ being a heading of the second aircraft.

9. Method according to claim 5, wherein the rotating point linking the rectilinear segment of the first evasive part and the rectilinear starting segment of the second homing part of an avoidance trajectory is chosen to be reached by the first aircraft after a minimum period of time $t_{cpa}$ equal to:

$$t_{cpa} = -\left(\frac{(\overrightarrow{X_1X_2})(\vec{V}_2 - \vec{V}_1^n)}{\|\vec{V}_2 - \vec{V}_1^n\|^2}\right)$$

$\vec{V}_1^n$ being a horizontal speed vector of the first aircraft when it travels through the first evasive part of its avoidance trajectory.

10. Method according to claim 6, wherein the rotating point linking the rectilinear segment of the first evasive part and the rectilinear starting segment of the second homing part of an avoidance trajectory is chosen on the rectilinear part of the first evasive part, beyond a point where the separation distance between the first and second aircraft passes through a minimum distance equal to the minimum safety distance, and whose position is determined by distance $D_{CPA1}$ from a point marking a start of the at least one avoidance path drawn from relationship:

$$D_{CPA1} = t_{cpa} \times \|\vec{V}_1\|$$

with:

$$t_{cpa} = -\left(\frac{(\overrightarrow{X_1X_2})(\vec{V}_2 - \vec{V}_1^n)}{\|\vec{V}_2 - \vec{V}_1^n\|^2}\right)$$

$\vec{V}_1^n$ being a horizontal speed vector of the first aircraft following the rectilinear segment of the first evasive part of its avoidance trajectory.

11. Method according to claim 9, wherein the rotating point linking the rectilinear segment of the first evasive part and the rectilinear starting segment of the second homing part of an avoidance trajectory is chosen on the rectilinear segment of the first evasive part, beyond the point where the separation distance between the two aircraft passes through a minimum distance equal to the minimum safety distance, at a distance $D_{PT}$ from this point drawn from relationship:

$$t_{PT} = S \times \tan\left(\frac{\overrightarrow{X_{EOM}} - (\overrightarrow{\psi_{SOM}} + \pi + \overrightarrow{\alpha_{SOM}})}{2}\right) \times \frac{1}{\|\vec{V}_2 - \vec{V}_{1SOM}\|}$$

wherein:

$\vec{\chi}_{E\ OM}$ is a heading of a relative speed vector of the second aircraft with respect to the first aircraft when the first aircraft embarks on the rectilinear segment starting the second evasive part of its avoidance trajectory, $\vec{\Psi}_{S\ OM}$ is a heading of the oriented segment linking a position of the first aircraft with that of the second aircraft when the first aircraft is at the starting point of the first evasive part of its avoidance trajectory, after having adopted its heading, $\vec{\alpha}_{S\ OM}$ is a half-angle at which the second aircraft perceives the circle of protection of the first aircraft while the first aircraft is at the starting point of the first evasive part of its avoidance path, this half-angle being oriented from the oriented segment, linking the position of the second aircraft to that of the first aircraft, towards a side of the angle at which the second aircraft perceives the circle of protection of the first aircraft, adopted to obtain passage of a trajectory of the second aircraft relative to the first aircraft, when the first aircraft describes the rectilinear segment of the first evasive part of its avoidance trajectory, and $\vec{V}_{1\ SOM}$ is a horizontal speed vector adopted by the first aircraft when it follows the rectilinear segment starting the second homing part of its avoidance trajectory.

\* \* \* \* \*